(12) United States Patent
Kobayashi et al.

(10) Patent No.: US 10,359,110 B2
(45) Date of Patent: Jul. 23, 2019

(54) CONTROLLER FOR VEHICLE AND CONTROL METHOD FOR VEHICLE

(71) Applicant: TOYOTA JIDOSHA KABUSHIKI KAISHA, Toyota-shi (JP)

(72) Inventors: Nobufusa Kobayashi, Anjo (JP); Koki Minamikawa, Toyota (JP); Masayuki Baba, Toyota (JP); Toru Matsubara, Toyota (JP); Munehiro Katsumata, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/830,078

(22) Filed: Dec. 4, 2017

(65) Prior Publication Data

US 2018/0163859 A1   Jun. 14, 2018

(30) Foreign Application Priority Data

Dec. 9, 2016 (JP) .................................. 2016-239820

(51) Int. Cl.
| | |
|---|---|
| *F16H 61/12* | (2010.01) |
| *F16H 61/68* | (2006.01) |

(Continued)

(52) U.S. Cl.
CPC ............. *F16H 61/12* (2013.01); *B60K 6/445* (2013.01); *B60K 6/547* (2013.01); *B60W 10/08* (2013.01);

(Continued)

(58) Field of Classification Search
None
See application file for complete search history.

(56) References Cited

U.S. PATENT DOCUMENTS

| 7,544,140 B2 * | 6/2009 | Tabata | ................... | B60W 10/10 |
|---|---|---|---|---|
| | | | | 475/5 |
| 7,578,765 B2 * | 8/2009 | Tabata | ................... | B60K 6/445 |
| | | | | 477/5 |

(Continued)

FOREIGN PATENT DOCUMENTS

| JP | 2006-046487 A | 2/2006 |
|---|---|---|
| JP | 2006-321392 | 11/2006 |

(Continued)

*Primary Examiner* — Dirk Wright
(74) *Attorney, Agent, or Firm* — Oblon, McClelland, Maier & Neustadt, L.L.P.

(57) ABSTRACT

A controller for a vehicle including a continuously variable transmission mechanism, a mechanical stepped transmission mechanism, and a drive wheel is provided. The controller includes an electronic control unit. The electronic control unit is configured to execute gear change control of the mechanical stepped transmission mechanism so as to establish any simulated gear stage of a plurality of simulated gear stages and to change a gear ratio of the continuously variable transmission mechanism stepwise. When determining that the mechanical stepped transmission mechanism has failed, the electronic control unit is configured to fix the mechanical stepped transmission mechanism at a limp-home mode mechanical gear stage, prohibit a stepped gear change of the continuously variable transmission mechanism, and change the gear ratio of the continuously variable transmission mechanism in a stepless manner on the basis of a vehicle state.

6 Claims, 8 Drawing Sheets

(51) Int. Cl.
*B60K 6/445* (2007.10)
*B60W 10/115* (2012.01)
*B60K 6/547* (2007.10)
*B60W 10/08* (2006.01)
*B60W 20/30* (2016.01)
*F16H 59/74* (2006.01)
*F16H 61/66* (2006.01)
*F16H 61/70* (2006.01)
*B60W 50/029* (2012.01)
*B60W 50/14* (2012.01)

(52) U.S. Cl.
CPC .......... *B60W 10/115* (2013.01); *B60W 20/30* (2013.01); *F16H 61/68* (2013.01); *B60W 2050/0295* (2013.01); *B60W 2050/146* (2013.01); *B60W 2710/1005* (2013.01); *F16H 61/66* (2013.01); *F16H 61/702* (2013.01); *F16H 2059/743* (2013.01); *F16H 2061/1208* (2013.01); *F16H 2061/1232* (2013.01); *Y02T 10/7258* (2013.01)

(56) References Cited

U.S. PATENT DOCUMENTS

| | | | |
|---|---|---|---|
| 9,527,507 B2 * | 12/2016 | Oba | ............... B60W 20/50 |
| 2007/0197336 A1 | 8/2007 | Tabata et al. | |
| 2017/0297559 A1 | 10/2017 | Minamikawa et al. | |

FOREIGN PATENT DOCUMENTS

| | | |
|---|---|---|
| JP | 2008-038998 A | 2/2008 |
| JP | 2009-149179 A | 7/2009 |
| JP | 2016-101852 A | 6/2016 |
| JP | 2016-176580 A | 10/2016 |
| JP | 2017-194103 | 10/2017 |
| KR | 10-2016-0081227 A | 7/2016 |

* cited by examiner

FIG. 2

| AT GEAR STAGE | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |

| SIMULATED GEAR STAGE | 1 | 2 | 3 | 4 | 5 | 6 | 7 | 8 | 9 | 10 |
|---|---|---|---|---|---|---|---|---|---|---|
| AT GEAR STAGE | 1 | 1 | 1 | 2 | 2 | 2 | 3 | 3 | 3 | 4 |

CONTROLLER FOR VEHICLE AND CONTROL METHOD FOR VEHICLE

INCORPORATION BY REFERENCE

The disclosure of Japanese Patent Application No. 2016-239820 filed on Dec. 9, 2016 including the specification, drawings and abstract is incorporated herein by reference in its entirety.

BACKGROUND

1. Technical Field

The disclosure relates to a controller for a vehicle and a control method for a vehicle. In particular, the disclosure relates to a fail-safe technique in a case of failure of a mechanical stepped transmission mechanism that is provided in series with a continuously variable transmission mechanism.

2. Description of Related Art

A vehicle is disclosed in Japanese Patent Application Publication No. 2006-321392 (JP 2006-321392 A). The vehicle has: a continuously variable transmission mechanism capable of changing a rotational speed of a drive source in a stepless manner and transmitting the rotational speed to an intermediate transmission member; and a mechanical stepped transmission mechanism disposed between the intermediate transmission member and drive wheels and capable of mechanically establishing a plurality of mechanical gear stages, each of which has a different gear ratio of a rotational speed of the intermediate transmission member with respect to an output rotational speed. In JP 2006-321392 A, it is proposed that a technique of changing a gear ratio of the continuously variable transmission mechanism (a differential section) stepwise and thereby allowing a transmission that includes the mechanical stepped transmission mechanism to perform a gear change operation like a stepped transmission as a whole.

SUMMARY

A fail-safe technique has been known. In the fail-safe technique, in the case where the stepped transmission mechanism fails, the mechanical gear stage of the stepped transmission mechanism is fixed at any of the plurality of mechanical gear stages, and the vehicle can thereby travel in a limp home mode. When such a technique is applied to the technique of allowing the transmission as the whole to perform the gear change operation like the stepped transmission as described above, the rotational speed of the intermediate transmission member is restricted in accordance with a vehicle speed due to fixation of the mechanical gear stage, and the rotational speed of the drive source is further restricted due to a stepwise operation of the continuously variable transmission mechanism. As a result, securement of power performance possibly becomes difficult, and fuel economy is possibly degraded.

The disclosure provides a controller for a vehicle and a control method for a vehicle which improve power performance and prevent degradation of fuel economy during failure of a mechanical stepped transmission mechanism when a transmission as a whole that includes a continuously variable transmission mechanism and the mechanical stepped transmission mechanism performs a gear change operation like a stepped transmission.

A first aspect of the disclosure provides a controller for a vehicle. The vehicle includes a continuously variable transmission mechanism, a mechanical stepped transmission mechanism, and a drive wheel. The continuously variable transmission mechanism is configured to change a rotational speed of a drive source in a stepless manner and transmit the rotational speed to an intermediate transmission member. The mechanical stepped transmission mechanism is disposed between the intermediate transmission member and the drive wheel. The mechanical stepped transmission mechanism is configured to mechanically establish a plurality of mechanical gear stages, each of which has a different first gear ratio of a rotational speed of the intermediate transmission member with respect to an output rotational speed. The controller includes an electronic control unit. The electronic control unit is configured to execute gear change control of the mechanical stepped transmission mechanism so as to establish any simulated gear stage of a plurality of simulated gear stages and to change a gear ratio of the continuously variable transmission mechanism stepwise. The plurality of simulated gear stages are gear stages, each of which has a different second gear ratio of the rotational speed of the drive source with respect to the output rotational speed of the mechanical stepped transmission mechanism. The plurality of simulated gear stages are allocated such that one or more of the simulated gear stages are established for each of the plurality of mechanical gear stages. The number of the one or more simulated gear stages is equal to or larger than the number of the plurality of mechanical gear stages. When the electronic control unit determines that the mechanical stepped transmission mechanism has failed, the electronic control unit is configured to fix the mechanical stepped transmission mechanism at a limp-home mode mechanical gear stage, prohibit a stepped gear change of the continuously variable transmission mechanism, and change the gear ratio of the continuously variable transmission mechanism in a stepless manner based on a vehicle state. The limp-home mode mechanical gear stage is any mechanical gear stage of the plurality of mechanical gear stages.

With the above configuration, the plurality of simulated gear stages, each of which has the different gear ratio (the different second gear ratio) of a transmission as a whole, are established by the electronic control unit. Accordingly, when the simulated gear stage is changed by a manual gear change or an automatic gear change, the rotational speed of the drive source is changed for an increase or a decrease. Thus, superior driving feeling is obtained. Meanwhile, in failure-time control (fail-safe control) of a case where it is determined that the mechanical stepped transmission mechanism has failed, the vehicle can travel in a limp home mode by establishing the specified limp-home mode mechanical gear stage, the stepped gear change of the continuously variable transmission mechanism is prohibited, and the gear ratio of the continuously variable transmission mechanism is changed in the stepless manner on the basis of the vehicle state. Accordingly, while the rotational speed of the intermediate transmission member is restricted in accordance with a vehicle speed, a restriction on the rotational speed of the drive source by the vehicle speed is relaxed. Thus, when the gear ratio of the continuously variable transmission mechanism is changed in the stepless manner, so as to be able to use maximum power of the drive source, for example, power performance during travel in the limp home mode can be secured. In addition, when the gear ratio of the continuously variable transmission mechanism is changed in the stepless manner, so as to actuate the drive source on an optimum fuel economy line, fuel economy can be improved.

In the controller, the limp-home mode mechanical gear stage may be the lowest-speed mechanical gear stage, the first gear ratio of which is the highest of the plurality of mechanical gear stages.

With the above configuration, the lowest-speed mechanical gear stage of the mechanical stepped transmission mechanism is set as the limp-home mode mechanical gear stage. Thus, high torque can be output at the first gear ratio, which is high. Therefore, the maximum power performance can be secured for the travel in the limp home mode.

In the controller, the mechanical stepped transmission mechanism may establish the plurality of mechanical gear stages in accordance with engaged state and disengaged state of a plurality of hydraulic engagement devices. The mechanical stepped transmission mechanism may be provided with a hydraulic control circuit that includes solenoid valves. The solenoid valves may be configured to electrically switch the engaged state and the disengaged state of the hydraulic engagement devices, respectively. The hydraulic control circuit may include a first circuit that mechanically establishes the predetermined limp-home mode mechanical gear stage of the plurality of mechanical gear stages when all power supplies involved in hydraulic control are turned off. The electronic control unit may be configured to establish the limp-home mode mechanical gear stage by turning off all of the power supplies when the electronic control unit determines that the mechanical stepped transmission mechanism has failed.

With the above configuration, the mechanical stepped transmission mechanism is provided. In the mechanical stepped transmission mechanism, the plurality of mechanical gear stages are established when the engaged/disengaged states of the hydraulic engagement devices are respectively switched by the solenoid valves. The first circuit (an all-OFF time gear stage establishing circuit) that mechanically establishes the limp-home mode mechanical gear stage when the all of the power—supplies are turned off. In such a case, when the failure of the mechanical stepped transmission mechanism is determined, all of the power supplies are turned OFF, and the limp-home mode mechanical gear stage is established. Thus, without identifying a failed part such as the solenoid valve, all of the power supplies are turned OFF, and the limp-home mode mechanical gear stage is established. Therefore, the vehicle can travel in the limp home mode.

The vehicle may further include a failure display device. In the controller, the electronic control unit may be configured to make the failure display device display such a warning that the mechanical stepped transmission mechanism has failed when the electronic control unit determines that the mechanical stepped transmission mechanism has failed.

With the above configuration, when the failure of the mechanical stepped transmission mechanism is determined, such a warning that the mechanical stepped transmission mechanism has failed is displayed by the failure display device. Accordingly, even in the case where the gear change control that corresponds to an accelerator operation amount, for example, is not executed or desired driving force performance cannot be obtained during the travel in the limp home mode in the fail-safe control by a failure-time control section, a driver can recognize the failure by the warning and promptly make the vehicle travel in the limp home mode depending on the vehicle state or the like when necessary.

In the controller, the intermediate transmission member may be an output rotational member of the continuously variable transmission mechanism.

A second aspect of the disclosure is a control method for a vehicle. The vehicle includes a continuously variable transmission mechanism, a mechanical stepped transmission mechanism, a drive wheel, and an electronic control unit. The continuously variable transmission mechanism is configured to change a rotational speed of a drive source in a stepless manner and transmit the rotational speed to an intermediate transmission member. The mechanical stepped transmission mechanism is disposed between the intermediate transmission member and the drive wheel. The mechanical stepped transmission mechanism is configured to mechanically establish a plurality of mechanical gear stages, each of which has a different first gear ratio of a rotational speed of the intermediate transmission member with respect to an output rotational speed. The control method includes: executing gear change control of the mechanical stepped transmission mechanism so as to establish any simulated gear stage of a plurality of simulated gear stages and changing a gear ratio of the continuously variable transmission mechanism stepwise by the electronic control unit; and, when the electronic control unit determines that the mechanical stepped transmission mechanism has failed, fixing the mechanical stepped transmission mechanism at a limp-home mode mechanical gear stage, prohibiting a stepped gear change of the continuously variable transmission mechanism, and changing the gear ratio of the continuously variable transmission mechanism in a stepless manner based on a vehicle state, by the electronic control unit. The plurality of simulated gear stages are gear stages, each of which has a different second gear ratio of the rotational speed of the drive source with respect to the output rotational speed of the mechanical stepped transmission mechanism. The plurality of simulated gear stages are allocated such that one or more of the simulated gear stages are established for each of the plurality of mechanical gear stages. The number of the one or more simulated gear stages is equal to or larger than the number of the plurality of mechanical gear stages. The limp-home mode mechanical gear stage is any mechanical gear stage of the plurality of mechanical gear stages.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 2 is an engagement actuation table that illustrates a plurality of AT gear stages of a mechanical stepped transmission mechanism in FIG. 1 and an engagement device that establishes the AT gear stages;

DETAILED DESCRIPTION OF EMBODIMENTS

Figure 1:
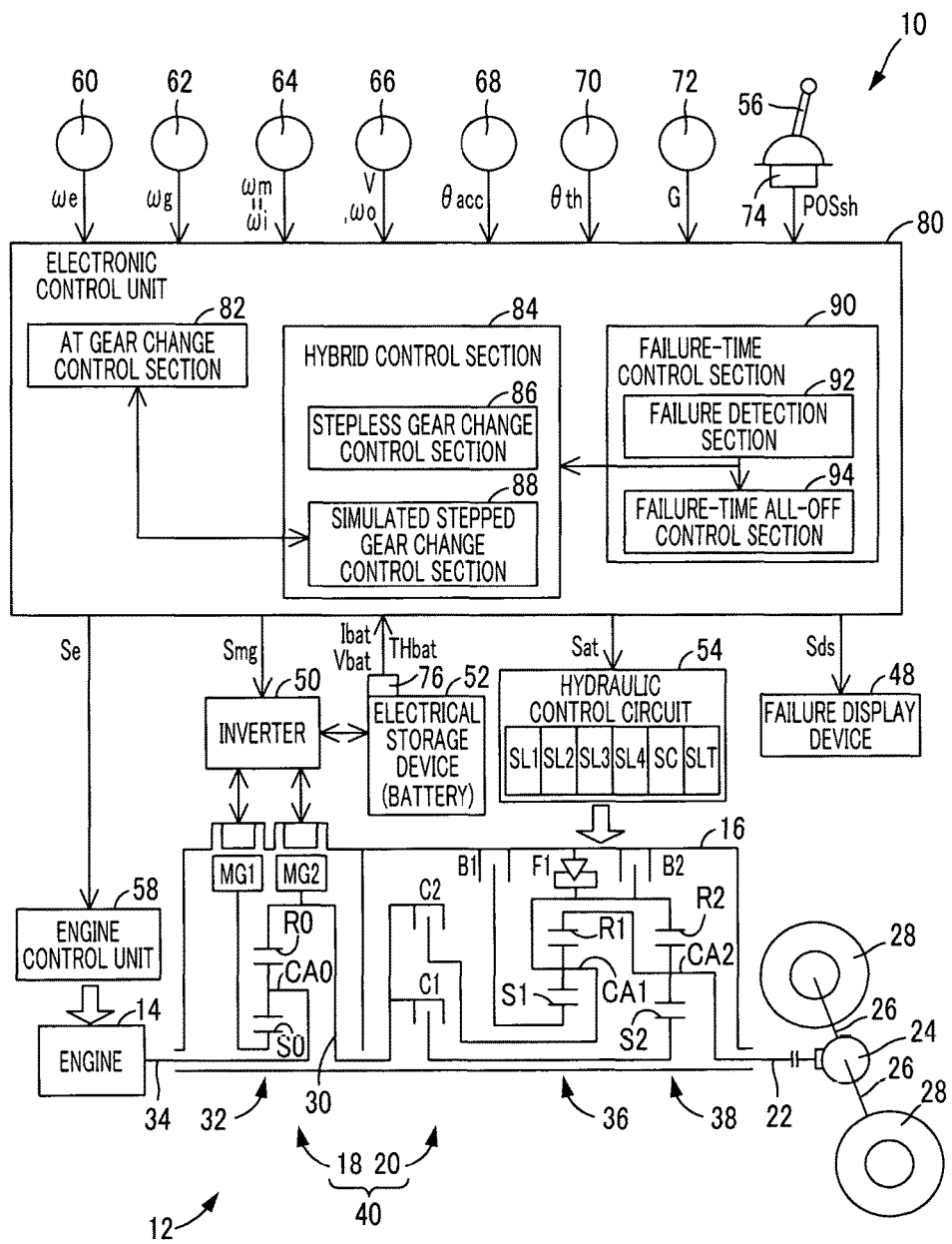
FIG. 1 is a view that illustrates a schematic configuration of a vehicle drive system provided in a vehicle, to which the disclosure is applied, and is also a view that illustrates control functions for various types of control and a main section of a control system in the vehicle.

The disclosure is applied to an engine-driven vehicle that includes an engine such as an internal combustion engine as a drive source, an electric vehicle that includes a rotary machine as the drive source, and the like. The disclosure can also be applied to a hybrid vehicle that includes the engine and the rotary machine as the drive sources. As a continuously variable transmission mechanism, an electric continuously variable transmission mechanism capable of changing a rotational speed of the drive source in a stepless manner by torque control of a differential rotary machine, for example, and transmitting the rotational speed to an intermediate transmission member is preferably used. However, a mechanical continuously variable transmission mechanism of a belt type, a toroidal type, or the like can also be adopted therefor. The electric continuously variable transmission mechanism is configured by having a differential mechanism such as a planetary gear device. However, a paired-rotor motor that has an inner rotor and an outer rotor can also be used in the electric continuously variable transmission mechanism. In this case, the drive source is coupled to either one of those rotors, and the intermediate transmission member is coupled to the other thereof. Similar to a motor generator, the paired-rotor motor can selectively output motoring torque and regenerative torque and functions as the differential rotary machine. The drive source and the intermediate transmission member are coupled to the above differential mechanism and the like via a clutch, a transmission gear, and the like when necessary. When necessary, a travel drive rotary machine is coupled to the intermediate transmission member either directly or via the transmission gear and the like. The rotary machine is an electrical rotating machine and is specifically the motor generator that can alternatively use a function of an electric motor, a function of a generator, or the functions of both of those. The generator can be adopted as the differential rotary machine, and the electric motor can be adopted as the travel drive rotary machine.

As the differential mechanism of the electric continuously variable transmission mechanism, the single planetary gear device of a single-pinion type or a double-pinion type is preferably used. This planetary gear device includes three rotational elements that are a sun gear, a carrier, and a ring gear. In a collinear diagram in which rotational speeds thereof can be connected by a straight line, for example, the drive source is coupled to the rotational element that is positioned in the middle and has an intermediate rotational speed (the carrier of the planetary gear device of the single-pinion type or the ring gear of the planetary gear device of the double-pinion type), and the differential rotary machine and the intermediate transmission member are respectively coupled to the rotational elements at both ends. However, the intermediate transmission member may be coupled to the intermediate rotational element. Differential rotation of these three rotational elements may always be allowed. Alternatively, the differential rotation thereof can be restricted by integrally coupling these three rotational elements using two arbitrary clutches, so as to achieve integral rotation thereof in accordance with a driving state or by stopping rotation of the rotational element, to which the differential rotary machine is coupled, using a brake.

As a mechanical stepped transmission mechanism, transmissions of a planetary gear type and a parallel-shaft type have widely been used. The mechanical stepped transmission mechanism is configured to establish a plurality of gear stages (mechanical gear stages) by engaging/disengaging a plurality of hydraulic engagement devices, for example.

A plurality of simulated gear stages are established by controlling the rotational speed of the drive source in accordance with an output rotational speed such that a gear ratio (a second gear ratio) of each of the simulated gear stages can be maintained. However, each of the gear ratios does not always need to have a constant value like the mechanical gear stage of the mechanical stepped transmission mechanism, but may be changed within a specified range, or may be restricted by setting an upper limit, a lower limit, or the like of the rotational speed of each component. As a simulated gear stage change condition, a gear change map with an upshift line, a downshift line, and the like is appropriate. The gear change map is defined in advance with the driving states of the vehicle such as the output rotational speed and an accelerator operation amount as parameters. However, another automatic gear change condition can be defined, and the gear stage may be changed in accordance with a gear change instruction by a driver using a shift lever, an up/down switch, or the like.

The number of the simulated gear stages only needs to be larger than the number of the mechanical gear stages. The number of the simulated gear stages may be the same as the number of the mechanical gear stages; however, the number of the simulated gear stages is desirably larger than the number of the mechanical gear stages, and the number of the simulated gear stages is appropriately twice or more as large as the number of the mechanical gear stages. The mechanical gear stage is changed so as to retain the rotational speed of the intermediate transmission member or the rotational speed of the travel drive rotary machine, which is coupled to the intermediate transmission member, within a specified rotational speed range. The simulated gear stage is changed so as to retain the rotational speed of the drive source within a specified rotational speed range. The number of these mechanical gear stages and simulated gear stages is appropriately determined. However, the number of the mechanical gear stages appropriately falls within a range of two to six gear stages, for example. The number of the simulated gear stages appropriately falls within a range of five to twelve gear stages, for example. The number of these mechanical gear stages and simulated gear stages can be set larger than the number described above. A gear change condition of each of the plurality of mechanical gear stages is defined such that the mechanical gear stage is changed at the same timing as changing of any of the simulated gear stages. In such a case, the mechanical gear stage of the mechanical stepped transmission mechanism is changed in conjunction with a change in the rotational speed of the drive source. In this way, the driver is less likely to receive a sense of discomfort even when a gear change shock occurs during a gear change of the mechanical stepped transmission mechanism. However, when the disclosure is implemented, the plurality of mechanical gear stages do not always have to be changed at the same timing as changing of the simulated gear stages. Gear change control of the continuously variable transmission mechanism may be executed such that the rotational speed of the drive source is not changed during changing of the mechanical gear stage.

An example of failure of the mechanical stepped transmission mechanism is failure of a solenoid valve that controls engagement and disengagement of the hydraulic engagement devices for establishing the plurality of mechanical gear stages, for example. As phenomena of the failure, the input rotational speed is raced due to engagement failure of the hydraulic engagement device, and the actual gear ratio deviates from a theoretical gear ratio of the current mechanical gear stage. The engagement failure of the hydraulic engagement device may include a slipped state in addition to a disengaged state. In addition, in a case of failure of a sensor that detects the output rotational speed, only an increase in the input rotational speed is detected while the output rotational speed remains zero. Accordingly, a failure determination is possibly made in a similar manner to the engagement failure of the above hydraulic engagement device. The failure determination of the solenoid valve and the like can also be made by using a hydraulic sensor such as an oil pressure switch. Also, in the case where the hydraulic pressure sensor, a rotational speed sensor, or the like fails, the gear change control may not appropriately be executed. Thus, the failure determination of the mechanical stepped transmission mechanism is desirably made by including the failure of any of those sensors. This failure determination is made not only when the failure of the above solenoid valve or the like is confirmed but also when there is a possibility of the failure of the solenoid valve or the like. For example, in the case where hydraulic oil is supplied from an electric oil pump during motor travel in which the vehicle travels by using the rotary machine as the drive source, the engagement failure of the hydraulic engagement device causes racing of the input rotational speed due to failure of the electric oil pump such as disconnection. However, a cause of the failure is not identified by simply detecting racing of the input rotational speed. Thus, also in this case, the failure determination that indicates the possible failure of the solenoid valve may be made, and failure-time control (fail-safe control) such as fixation of the mechanical gear stage to a limp-home mode mechanical gear stage may be executed.

A detailed description will hereinafter be made on an embodiment of the disclosure with reference to the drawings. FIG. 1 is a view that illustrates a schematic configuration of a vehicle drive system 12 provided in a vehicle 10, to which the disclosure is applied, and is also a view that illustrates a main section of a control system for various types of control in the vehicle 10. In FIG. 1, the vehicle drive system 12 includes an engine 14, an electric continuously variable transmission mechanism 18 (hereinafter referred to as a continuously variable transmission mechanism 18), and a mechanical stepped transmission mechanism 20 (hereinafter referred to as a stepped transmission mechanism 20) in series. The continuously variable transmission mechanism 18 is coupled to the engine 14 either directly or indirectly via an unillustrated damper and the like, and the stepped transmission mechanism 20 is coupled to an output side of the continuously variable transmission mechanism 18. The continuously variable transmission mechanism 18 and the stepped transmission mechanism 20 are disposed on a common axis in a transmission case 16 (hereinafter referred to as a case 16) that is a non-rotational member attached to a vehicle body. The vehicle drive system 12 also includes: a differential gear device 24 that is coupled to an output shaft 22 as an output rotational member of the stepped transmission mechanism 20; paired axles 26 that is coupled to the differential gear device 24; and the like. In the vehicle drive system 12, power (torque and a force have the same meaning unless otherwise distinguished) output from the engine 14 and a second rotary machine MG2, which will be described below, is transmitted to the stepped transmission mechanism 20, and is then transmitted from the stepped transmission mechanism 20 to drive wheels 28 provided in the vehicle 10 via the differential gear device 24 and the like. The vehicle drive system 12 is preferably used for a vehicle with a front-engine, rear-wheel-drive (FR) layout in which the vehicle drive system 12 is longitudinally arranged in the vehicle 10, for example. Note that the continuously variable transmission mechanism 18, the stepped transmission mechanism 20, and the like are configured to be substantially symmetrical about a rotation axis of the engine 14 and the like (the above common axis), and lower half portions of those from the rotation axis are not shown in FIG. 1.

The engine 14 is a travel power source of the vehicle 10 and is the internal combustion engine such as a gasoline engine or a diesel engine. Engine torque Te of this engine 14 is controlled when an electronic control unit 80, which will be described below, controls operation states of the engine 14 such as a throttle valve opening degree or an intake air amount, a fuel supply amount, and ignition timing. In this embodiment, the engine 14 is coupled to the continuously variable transmission mechanism 18 without interposing a fluid-type transmission device such as a torque converter or a fluid coupling therebetween.

The continuously variable transmission mechanism 18 includes: a first rotary machine MG1, a differential mechanism 32, and the second rotary machine MG2. As a power split mechanism, the differential mechanism 32 mechanically splits the power of the engine 14 to the first rotary machine MG1 and an intermediate transmission member 30 that is an output rotational member of the continuously variable transmission mechanism 18. The second rotary machine MG2 is coupled to the intermediate transmission member 30 in a manner to allow power transmission. The continuously variable transmission mechanism 18 is an electric differential section in which a differential state of the differential mechanism 32 is controlled by controlling an operation state of the first rotary machine MG1, and is an electric continuously variable transmission. The first rotary machine MG1 corresponds to the differential rotary machine. The second rotary machine MG2 is a motor that functions as the travel power source, and corresponds to the travel drive rotary machine. The vehicle 10 is a hybrid vehicle that includes the engine 14 and the second rotary machine MG2 as the travel power sources, that is, the drive sources.

Each of the first rotary machine MG1 and the second rotary machine MG2 is the electrical rotating machine that has the function as the motor and the function as the generator, and is the so-called motor generator. Each of the first rotary machine MG1 and the second rotary machine MG2 is connected to a battery 52 provided in the vehicle 10 via an inverter 50 provided in the vehicle 10. When the inverter 50 is controlled by the electronic control unit 80, which will be described below, MG1 torque Tg and MG2 torque Tm as output torque (motoring torque or regenerative torque) of the first rotary machine MG1 and the second rotary machine MG2 are controlled. The battery 52 is an electrical storage device that supplies/receives electricity to/from each of the first rotary machine MG1 and the second rotary machine MG2.

The differential mechanism 32 is configured as the planetary gear device of the single-pinion type and includes three rotational elements of a sun gear S0, a carrier CA0, and a ring gear R0 in a manner to allow differential rotation thereof. The engine 14 is coupled to the carrier CA0 via a coupling shaft 34 in the manner to allow the power transmission. The first rotary machine MG1 is coupled to the sun gear S0 in the manner to allow power transmission. The second rotary machine MG2 is coupled to the ring gear R0 in the manner to allow the power transmission. In the differential mechanism 32, the carrier CA0 functions as an input element, the sun gear S0 functions as a reaction element, and the ring gear R0 functions as an output element.

The stepped transmission mechanism 20 is a stepped transmission that constitutes a part of a power transmission path between the intermediate transmission member 30 and the drive wheels 28. The intermediate transmission member 30 also functions as an input rotational member (an AT input rotational member) of the stepped transmission mechanism 20. The second rotary machine MG2 is coupled to the intermediate transmission member 30 in a manner to integrally rotate therewith. Accordingly, the stepped transmission mechanism 20 is the stepped transmission that constitutes a part of a power transmission path between the second rotary machine MG2 and the drive wheels 28. The stepped transmission mechanism 20 is an automatic transmission of a planetary gear type that includes: a plurality of units of the planetary gear devices that are a first planetary gear device 36 and a second planetary gear device 38; and the plurality of engagement devices that are a clutch C1, a clutch C2, a brake B1, and a brake B2 (hereinafter simply be referred to as engagement devices CB unless otherwise distinguished), for example.

The engagement device CB is a hydraulic friction engagement device that is configured by including: a multi-plate or single-plate clutch or brake that is pressed by a hydraulic actuator; a band brake that is tightened by the hydraulic actuator; and the like. Torque capacity (engagement torque) Tcb of the engagement devices CB is changed by regulated engagement hydraulic pressures Pcb that are each output from linear solenoid valves SL1 to SL4 (see FIG. 4) in a hydraulic control circuit 54 provided in the vehicle 10. In this way, actuation states (states of engagement, disengagement, and the like) of the engagement devices CB are switched each.

In the stepped transmission mechanism 20, each rotational element (sun gears S1, S2, carries CA1, CA2, ring gears R1, R2) of the first planetary gear device 36 and the second planetary gear device 38 is coupled to each other or is coupled to the intermediate transmission member 30, the case 16, or the output shaft 22 either directly or indirectly (or selectively) via the engagement device CR or a one-way clutch F1.

In the stepped transmission mechanism 20, due to engagement of specified engagement devices of the engagement devices CB, any of a plurality of gear stages, each of which has a different gear ratio γat (=an AT input rotational speed ωi/an output rotational speed ωo), is established. In this embodiment, the gear stage established in the stepped transmission mechanism 20 will be referred to as an AT gear stage. The AT gear stage is the mechanical gear stage, and the gear ratio γat is a first gear ratio. The AT input rotational speed ωi is a rotational speed (an angular velocity) of the input rotational member of the stepped transmission mechanism 20 and has the same value as a rotational speed of the intermediate transmission member 30 or has the same value as a MG2 rotational speed ωm that is a rotational speed of the second rotary machine MG2. The AT input rotational speed ωi can be represented by the MG2 rotational speed ωm. The output rotational speed ωo is a rotational speed of the output shaft 22 that is an output rotational speed of the stepped transmission mechanism 20, and is also an output rotational speed of a transmission 40 as a whole that includes the continuously variable transmission mechanism 18 and the stepped transmission mechanism 20.

Figure 2:
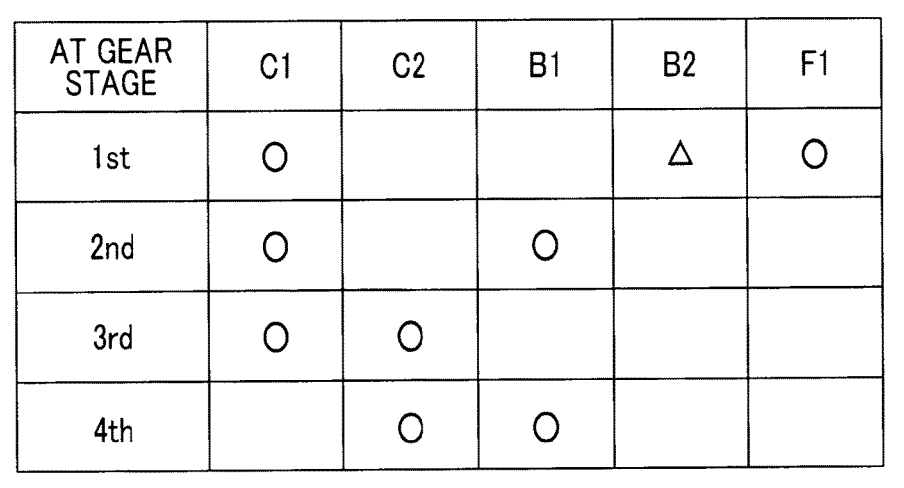

As shown in an engagement actuation table of FIG. 2, for example, in the stepped transmission mechanism 20, the four forward AT gear stages of a first AT gear stage "1st" to a fourth AT gear stage "4th" are established as the plurality of AT gear stages. The gear ratio γat is the highest at the first AT gear stage, and the gear ratio γat is decreased as a vehicle speed is increased (toward the fourth AT gear stage on a high side). In the engagement actuation table of FIG. 2, relationships between each of the AT gear stages and the actuation states of the engagement devices CB (the engagement devices that are engaged at each of the AT gear stages) are summarized. A "circle" represents the engagement, and a "triangle" represents the engagement during engine braking or a coast downshift of the stepped transmission mechanism 20, and a blank represents the disengagement. The one-way clutch F1 is provided in parallel with the brake B2 that establishes the first AT gear stage "1st". Thus, the brake B2 does not have to be engaged at a start (during acceleration) of the vehicle 10. Note that, when all of the engagement devices CB are disengaged, the stepped transmission mechanism 20 is brought into a neutral state where none of the AT gear stages is established (that is, a neutral state where power transmission is blocked).

The established AT gear stage of the stepped transmission mechanism 20 is switched (that is, any of the plurality of AT gear stages is selectively established) when the electronic control unit 80, which will be described below, controls the disengagement of the engagement devices on a disengaged side of the engagement devices CB and the engagement of the engagement devices on an engaged side of the engagement devices CB in accordance with an accelerator operation by the driver, a vehicle speed V, and the like. That is, in gear change control of the stepped transmission mechanism 20, a so-called clutch-to-clutch gear change is performed. In the clutch-to-clutch gear change, the gear stage is changed by switching the engagement of the engagement devices CB (that is, switching between the engagement and disengagement of the engagement devices CB), for example. For example, during a downshift from the second AT gear stage "2nd" to the first AT gear stage "1st" (a 2→1 downshift), as shown in the engagement actuation table of FIG. 2, the brake B1 as the engagement device on the disengaged side is disengaged, and the brake B2 is engaged. Of the engagement devices (the clutch C1 and the brake B2) that are engaged at the first AT gear stage "1st", the brake B2 is the engagement device on the engaged side that is disengaged before the 2→1 downshift. At this time, a transitional hydraulic pressure for the disengagement of the brake B1 and a transitional hydraulic pressure for the engagement of the brake B2 are subjected to regulation control in accordance with predetermined change patterns and the like.

Figure 4:
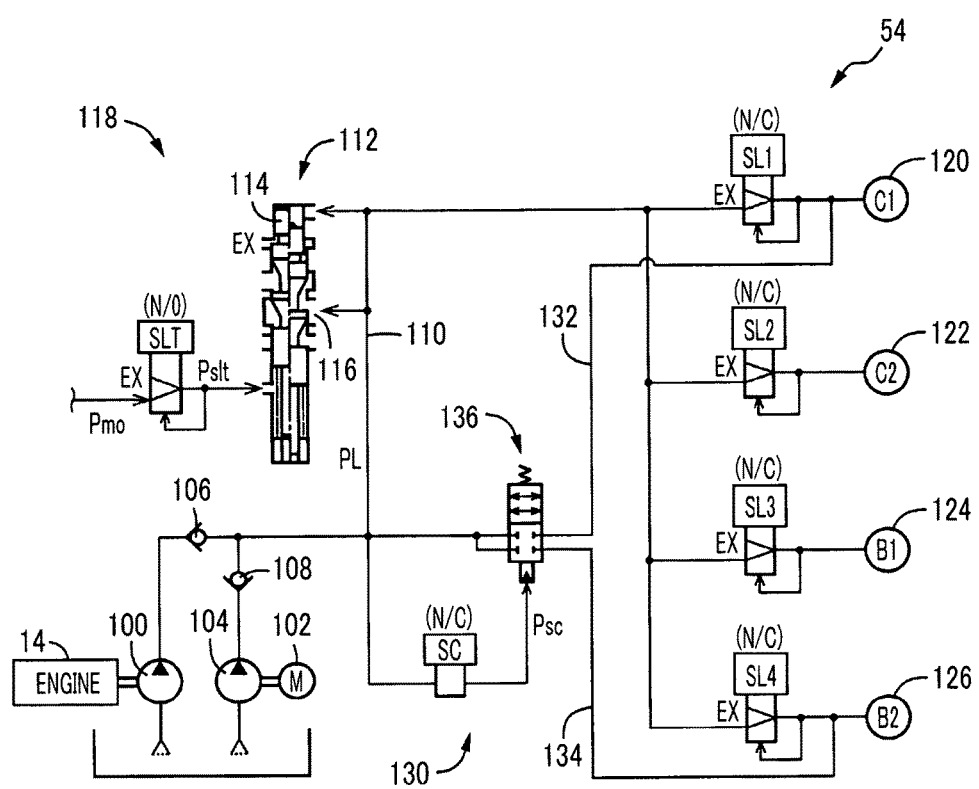
FIG. 4 is a circuit diagram that illustrates a hydraulic control circuit related to clutches C1, C2 and brakes B1, B2 of the mechanical stepped transmission mechanism.

FIG. 4 is a circuit diagram of a main section of the hydraulic control circuit 54 that includes the linear solenoid valves SL1 to SL4 executing engagement/disengagement control of the above engagement devices CB. As hydraulic pressure sources of the engagement devices CB, the hydraulic control circuit 54 includes: a mechanical oil pump 100 that is rotationally driven by the engine 14; and an electric oil pump (EOP) 104 that is rotationally driven by a pump motor 102 during non-actuation of the engine. Hydraulic oil output from these oil pumps 100, 104 is supplied to a line-pressure oil passage 110 via check valves 106, 108, respectively, and is regulated at a specified line pressure PL by a line-pressure control valve 112 such as a primary regulator valve. A linear solenoid valve SLT is connected to the line-pressure control valve 112. The linear solenoid valve SLT is electrically controlled by the electronic control unit 80 and thereby outputs a signal pressure Pslt by using a modulator oil pressure Pmo, which is a substantially constant pressure, as a source pressure. Then, when the signal pressure Pslt is supplied to the line-pressure control valve 112, a spool 114 of the line-pressure control valve 112 is urged by the signal pressure Pslt. The spool 114 moves in an axial direction while changing an opening area of a discharge channel 116. In this way, the line pressure PL is regulated in accordance with the signal pressure Pslt. This line pressure PL is regulated in accordance with an accelerator operation amount θacc as an output request amount or the like, for example. The above linear solenoid valve SLT is an electromagnetic pressure regulating valve for line-pressure regulation, and the line-pressure control valve 112 is a hydraulic control valve that regulates the line pressure PL in accordance with the signal pressure Pslt supplied from the linear solenoid valve SLT. A line-pressure regulator 118 is configured by including these line-pressure control valve 112 and linear solenoid valve SLT. The linear solenoid valve SLT is of a normally-opened (N/O) type. When the linear solenoid valve SLT is not energized due to the disconnection or the like, the modulator oil pressure Pmo is output as the signal pressure Pslt in a substantially unchanged manner and is regulated to the high line pressure PL by the line-pressure control valve 112.

The hydraulic oil at the line pressure PL, which is regulated by the line-pressure regulator 118, is supplied to the linear solenoid valves SL1 to SL4 and the like via the line-pressure oil passage 110. The linear solenoid valves SL1 to SL4 are arranged in a manner to respectively correspond to hydraulic actuators (hydraulic cylinders) 120, 122, 124, 126 of the clutches C1, C2 and the brakes B1, B2, and output hydraulic pressures (the engagement hydraulic pressures Pcb) thereof are controlled in accordance with an engagement/disengagement command (an excitation current of a solenoid) of a hydraulic control command signal Sat that is supplied from the electronic control unit 80. In this way, the clutches C1, C2 and the brakes B1, B2 are subjected to the engagement/disengagement control individually, and any of the AT gear stages of the first AT gear stage "1st" to the fourth AT gear stage "4th" is established. Each of the linear solenoid valves SL1 to SL4 is of a normally-closed (N/C) type. When the linear solenoid valves SL1 to SL4 are not energized due to the disconnection or the like, supply of the hydraulic pressure to the hydraulic actuators 120, 122, 124, 126 is blocked, and the clutches C1, C2 and the brakes B1, B2 can no longer be engaged. These linear solenoid valves SL1 to SL4 are the solenoid valves that selectively engage the clutches C1, C2 and the brakes B1, B2 in accordance with the hydraulic control command signal Sat supplied from the electronic control unit 80.

The hydraulic control circuit 54 is also provided with an all-OFF time gear stage establishing circuit (one example of the first circuit) 130 that mechanically establishes the first AT gear stage "1st" during an all-power-supply OFF time, during which all power supplies related to hydraulic control are turned off. The first AT gear stage "1st" is one example of the limp-home mode mechanical gear stage and is the lowest-speed mechanical gear stage at which the gear ratio γat is the highest of the plurality of AT gear stages of the stepped transmission mechanism 20. The all-OFF time gear stage establishing circuit 130 includes: bypass oil passages 132, 134 that are respectively provided in parallel with the linear solenoid valves SL1, SL4; and a switching valve 136 that connects/blocks each of those bypass oil passages 132, 134 to/from the line-pressure oil passage 110. The bypass oil passage 132 is an oil passage that connects the hydraulic actuator 120 of the clutch C1 and the line-pressure oil passage 110 without interposing the linear solenoid valve SL1 therebetween, and the bypass oil passage 134 is an oil passage that connects the hydraulic actuator 126 of the brake B2 and the line-pressure oil passage 110 without interposing the linear solenoid valve SL4 therebetween. The first AT gear stage "1st" is established when the line pressure PL is respectively supplied to the hydraulic actuators 120, 126 from these bypass oil passages 132, 134.

When a pilot pressure Psc is supplied from an ON/OFF solenoid valve SC, as shown in the drawing, the switching valve 136 is switched to a blocking position at which the switching valve 136 blocks both of the bypass oil passages 132, 134. When the supply of the pilot pressure Psc is stopped, the switching valve 136 is switched to a connecting position by an urging force of a spring. At the connecting position, the switching valve 136 connects both of the bypass oil passages 132, 134. The ON/OFF solenoid valve SC is of the normally-closed (N/C) type. When the ON/OFF solenoid valve SC is energized, the pilot pressure Psc is output, and the switching valve 136 is switched to the blocking position. When the ON/OFF solenoid valve SC is not energized, output of the pilot pressure Psc is stopped, and the switching valve 136 is switched to the connecting position. Normally, the ON/OFF solenoid valve SC is always in an energized state and outputs the pilot pressure Psc. During normal time during which the ON/OFF solenoid valve SC can be energized, both of the bypass oil passages 132, 134 are blocked, and the clutch C1 and the brake B2 are subjected to the engagement/disengagement control in accordance with engagement hydraulic pressures Pc1, Pb2 that are respectively supplied from the linear solenoid valves SL1, SL4. Meanwhile, during the all-power-supply OFF time, both of the bypass oil passages 132, 134 are connected. Accordingly, both of the clutch C1 and the brake B2 are engaged, and the first AT gear stage "1st" is established. In this way, the vehicle 10 can travel in the limp home mode at the first AT gear stage "1st". The linear solenoid valve SLT of the line-pressure regulator 118 is of the normally-opened type. Thus, even during the all-power-supply OFF time, the specified line pressure PL is secured by the line-pressure control valve 112. Note that the bypass oil passage 134 may not be provided, and the first AT gear stage "1st" may be established during the all-power-supply OFF time by simply engaging the clutch C1 via the bypass oil passage 132. Alternatively, in consideration of occurrence of the failure during the travel of the vehicle 10, another AT gear stage such as the third AT gear stage "3rd" may be established as the limp-home mode mechanical gear stage.

Figure 3:
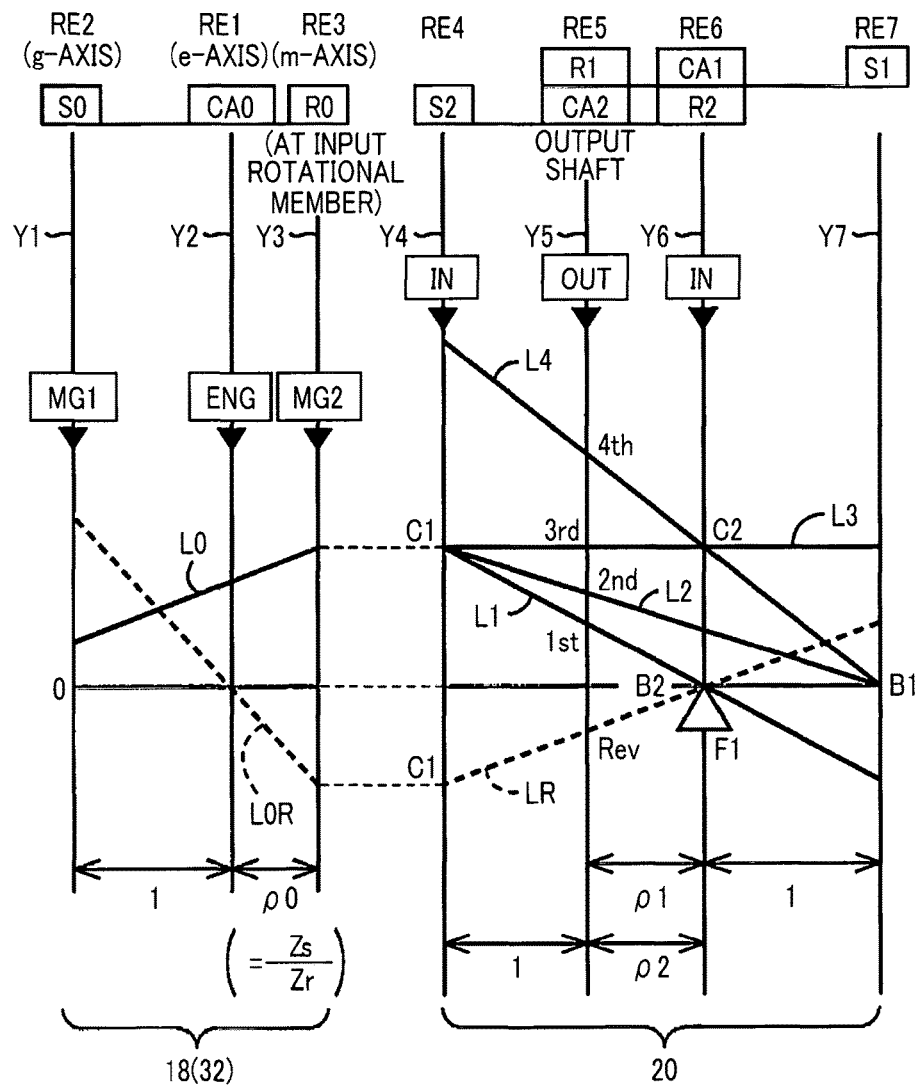
FIG. 3 is a collinear diagram that represents relative relationships among rotational speeds of rotational elements in an electric continuously variable transmission mechanism and the mechanical stepped transmission mechanism.

FIG. 3 is a collinear diagram that represents relative relationships among the rotational speeds of the rotational elements in the continuously variable transmission mechanism 18 and the stepped transmission mechanism 20. In FIG. 3, three vertical lines Y1, Y2, Y3 that correspond to the three rotational elements of the differential mechanism 32 constituting the continuously variable transmission mechanism 18 are a g-axis that represents a rotational speed of the sun gear S0 corresponding to a second rotational element RE2, an e-axis that represents a rotational speed of the carrier CA0 corresponding to a first rotational element RE1, and an m-axis that represents a rotational speed of the ring gear R0 (that is, the input rotational speed of the stepped transmission mechanism 20) corresponding to a third rotational element RE3 from a left side in this order. In addition, four vertical lines Y4, Y5, Y6, Y7 of the stepped transmission mechanism 20 are axes that respectively represent a rotational speed of the sun gear S2 corresponding to a fourth rotational element RE4, rotational speeds of the ring gear R1 and the carrier CA2 (that is, the rotational speed of the output shaft 22) that are coupled to each other, and each of which corresponds to a fifth rotational element RE5, rotational speeds of the carrier CA1 and the ring gear R2 that are coupled to each other, and each of which corresponds to a sixth rotational element RE6, and a rotational speed of the sun gear S1 corresponding to a seventh rotational element RE7 from the left side in this order. An interval between two each of the vertical lines Y1, Y2, Y3 is determined in accordance with a gear ratio (a teeth number ratio) p0 of the differential mechanism 32. In addition, an interval between two each of the vertical lines Y4, Y5, Y6, Y7 is determined in accordance with gear ratios ρ1, ρ2 of the first and second planetary gear devices 36, 38. In a case of the planetary gear device of the single-pinion type, when the interval between the sun gear and the carrier is set as "1" in relationships among the vertical axes in the collinear diagram, the interval between the carrier and the ring gear corresponds to a gear ratio ρ (=the number of teeth Zs of the sun gear/the number of teeth Zr of the ring gear).

When expressed by using the collinear diagram of FIG. 3, in the differential mechanism 32 of the continuously variable transmission mechanism 18, the engine 14 (see "ENG" in the drawing) is coupled to the first rotational element RE1, the first rotary machine MG1 (see "MG1" in the drawing) is coupled to the second rotational element RE2, and the second rotary machine MG2 (see "MG2" in the drawing) is coupled to the third rotational element RE3 that integrally rotates with the intermediate transmission member 30. In this way, it is configured that rotation of the engine 14 is transmitted to the stepped transmission mechanism 20 via the intermediate transmission member 30. In the continuously variable transmission mechanism 18, relationships among the rotational speeds of the sun gear S0, the carrier CA0, and the ring gear R0 are represented by straight lines L0, L0R, each of which crosses the vertical line Y2.

In the stepped transmission mechanism 20, the fourth rotational element RE4 is selectively coupled to the intermediate transmission member 30 via the clutch C1, the fifth rotational element RE5 is coupled to the output shaft 22, the sixth rotational element RE6 is selectively coupled to the intermediate transmission member 30 via the clutch C2 and is selectively coupled to the case 16 via the brake B2, and the seventh rotational element RE7 is selectively coupled to the case 16 via the brake B1. In the stepped transmission mechanism 20, relationships among the rotational speeds of the rotational elements RE4 to RE7 at the AT gear stages "1st", "2nd", "3rd", "4th", "Rev" are respectively represented by straight lines L1, L2, L3, L4, LR, each of which crosses the vertical line Y5, by the engagement/disengagement control of the engagement devices CB.

The straight line L0 and the straight lines L1, L2, L3, L4, which are illustrated by solid lines in FIG. 3, represent relative rotational speeds of the rotational elements during forward travel in a hybrid travel mode in which engine travel can be made. In the engine travel, the vehicle 10 travels using at least the engine 14 as the power source. In this hybrid travel mode, when the sun gear S0 receives reaction torque in positive rotation that is negative torque by the first rotary machine MG1 with respect to the engine torque Te received by the carrier CA0 in the differential mechanism 32, engine directly-transmitted torque Td [=Te/(1+ρ)=−(1/ρ)×Tg] that is positive torque in the positive rotation appears to the ring gear R0. Then, in response to a required driving force by the accelerator operation amount θacc and the like, combined torque of the engine directly-transmitted torque Td and the MG2 torque Tm is transmitted as the drive torque in a forward direction of the vehicle 10 to the drive wheels 28 via the stepped transmission mechanism 20 in which any of the AT gear stages of the first AT gear stage "1st" to the fourth AT gear stage "4th" is established. At this time, the first rotary machine MG1 functions as the generator that generates the negative torque in the positive rotation. Generated electricity Wg of the first rotary machine MG1 is stored in the battery 52 or consumed by the second rotary machine MG2. The second rotary machine MG2 outputs the MG2 torque Tm by using all or some of the generated electricity Wg or by using the electricity from the battery 52 in addition to the generated electricity Wg.

Although not shown in FIG. 3, in a motor travel mode, motor travel in which the engine 14 is stopped and the vehicle 10 travels by using the second rotary machine MG2 as the power source can be made. In a collinear diagram in the motor travel mode, rotation of the carrier CA0 is zero, and the ring gear R0 receives the MG2 torque Tm as the positive torque in the positive rotation in the differential mechanism 32. At this time, the first rotary machine MG1, which is coupled to the sun gear S0, is brought into an unloaded state and rotates idly in negative rotation. That is, in the motor travel mode, the engine 14 is not driven, an engine speed ωe as a speed of the engine 14 is zero, and the MG2 torque Tm (the motoring torque in the positive rotation herein) is transmitted as the drive torque in the forward direction of the vehicle 10 to the drive wheels 28 via the stepped transmission mechanism 20 in which any of the AT gear stages of the first AT gear stage "1st" to the fourth AT gear stage "4th" is established.

The straight line L0R and the straight line LR, which are illustrated by broken lines in FIG. 3, represent the relative rotational speeds of the rotational elements during reverse travel in the motor travel mode. During this reverse travel in the motor travel mode, the ring gear R0 receives the MG2 torque Tm as the negative torque in the negative rotation, and the MG2 torque Tm is transmitted as the drive torque in a reverse direction of the vehicle 10 to the drive wheels 28 via the stepped transmission mechanism 20 in which the first AT gear stage "1st" is established. The electronic control unit 80, which will be described below, can realize the reverse travel by outputting the MG2 torque Tm for the reverse travel (the motoring torque as the negative torque in the negative rotation herein; particularly represented as MG2 torque TmR) from the second rotary machine MG2 in a state where the first AT gear stage "1st", which is the gear stage for the forward travel on the low vehicle speed side (a low side) of the first AT gear stage "1st" to the fourth AT gear stage "4th", is established. The MG2 torque Tm for the reverse travel is motor torque for the reverse travel whose positive/negative rotation is opposite from that of the MG2 torque Tm for the forward travel (the motoring torque as the positive torque in the positive rotation herein; particularly represented as MG2 torque TmF) as the motor torque for the forward travel. Just as described, the vehicle 10 of this embodiment makes the reverse travel by reversing the positive/negative rotation of the MG2 torque Tm at the AT gear stage for the forward travel (that is, the same AT gear stage as that for the forward travel). In the stepped transmission mechanism 20, the AT gear stage that is dedicated for the reverse travel and at which the input rotation is reversed for output in the stepped transmission mechanism 20 is not established. Note that, also in the hybrid mode, the negative rotation of the second rotary machine MG2 can be generated as represented by the straight line L0R while the engine 14 remains rotating in a positive rotational direction; therefore, the vehicle can make the reverse travel in a similar manner to that in the motor travel mode.

In the vehicle drive system 12, the continuously variable transmission mechanism 18 as an electric transmission mechanism (an electric differential mechanism) is configured by including the differential mechanism 32 having the three rotational elements of: the carrier CA0 as the first rotational element RE1, to which the engine 14 is coupled in the manner to allow the power transmission; the sun gear S0 as the second rotational element RE2, to which the first rotary machine MG1 as a differential motor (the differential rotary machine) is coupled in the manner to allow the power transmission; and the ring gear R0 as the third rotational element RE3, to which the second rotary machine MG2 as a travel drive motor (the travel drive rotary machine) is coupled in the manner to allow the power transmission. In addition, the continuously variable transmission mechanism 18 is configured that the differential state of the differential mechanism 32 is controlled when the operation state of the first rotary machine MG1 is controlled. That is, the continuously variable transmission mechanism 18 is configured by having: the differential mechanism 32, to which the engine 14 is coupled in the manner to allow the power transmission; and the first rotary machine MG1 that is coupled to the differential mechanism 32 in the manner to allow the power transmission, and that the differential state of the differential mechanism 32 is controlled when the operation state of the first rotary machine MG1 is controlled. The continuously variable transmission mechanism 18 is actuated as the electric continuously variable transmission in which a gear ratio $\gamma 0$ ($=\omega e/\omega m$) of a rotational speed of the coupling shaft 34 (that is, the engine speed $\omega e$) with respect to the MG2 rotational speed $\omega m$ as the rotational speed of the intermediate transmission member 30 is changed in the stepless manner (continuously). The engine speed $\omega e$ corresponds to a drive source rotational speed.

For example, in the hybrid travel mode, when the specified AT gear stage is established in the stepped transmission mechanism 20, the rotational speed of the first rotary machine MG1 is controlled with respect to the rotational speed of the ring gear R0 that is restrained by rotation of the drive wheels 28, and the rotational speed of the sun gear S0 is thereby increased or decreased. Then, the rotational speed of the carrier CA0 (that is, the engine speed $\omega e$) is increased or decreased. Thus, in the engine travel in which the vehicle 10 travels by using the engine 14 as the power source, the engine 14 can be actuated at an efficient operation point. That is, by including the stepped transmission mechanism 20, in which the specified AT gear stage is established, and the continuously variable transmission mechanism 18, which is actuated as the continuously variable transmission, the transmission 40 as the whole can be configured as the continuously variable transmission.

In addition, because the gear ratio of the continuously variable transmission mechanism 18 can be changed like the stepped transmission, the gear ratio of the transmission 40 as the whole can be changed like the stepped transmission by the stepped transmission mechanism 20, in which the AT gear stage is established, and the continuously variable transmission mechanism 18, the gear ratio of which is changed like the stepped transmission. That is, in the transmission 40, cooperative control of the stepped transmission mechanism 20 and the continuously variable transmission mechanism 18 can be executed such that any of the plurality of gear stages (referred to as the simulated gear stages), each of which has a different gear ratio $\gamma t$ ($=\omega e/\omega o$) of the engine speed $\omega e$ with respect to the output rotational speed $\omega o$, is selectively established. The gear ratio $\gamma t$ is a total gear ratio that is realized by the continuously variable transmission mechanism 18 and the stepped transmission mechanism 20 arranged in series, and has a value ($\gamma t=\gamma 0 \times \gamma at$) that is obtained by multiplying a gear ratio $\gamma 0$ of the continuously variable transmission mechanism 18 by the gear ratio $\gamma at$ of the stepped transmission mechanism 20. This gear ratio $\gamma t$ corresponds to the second gear ratio.

Figure 5:
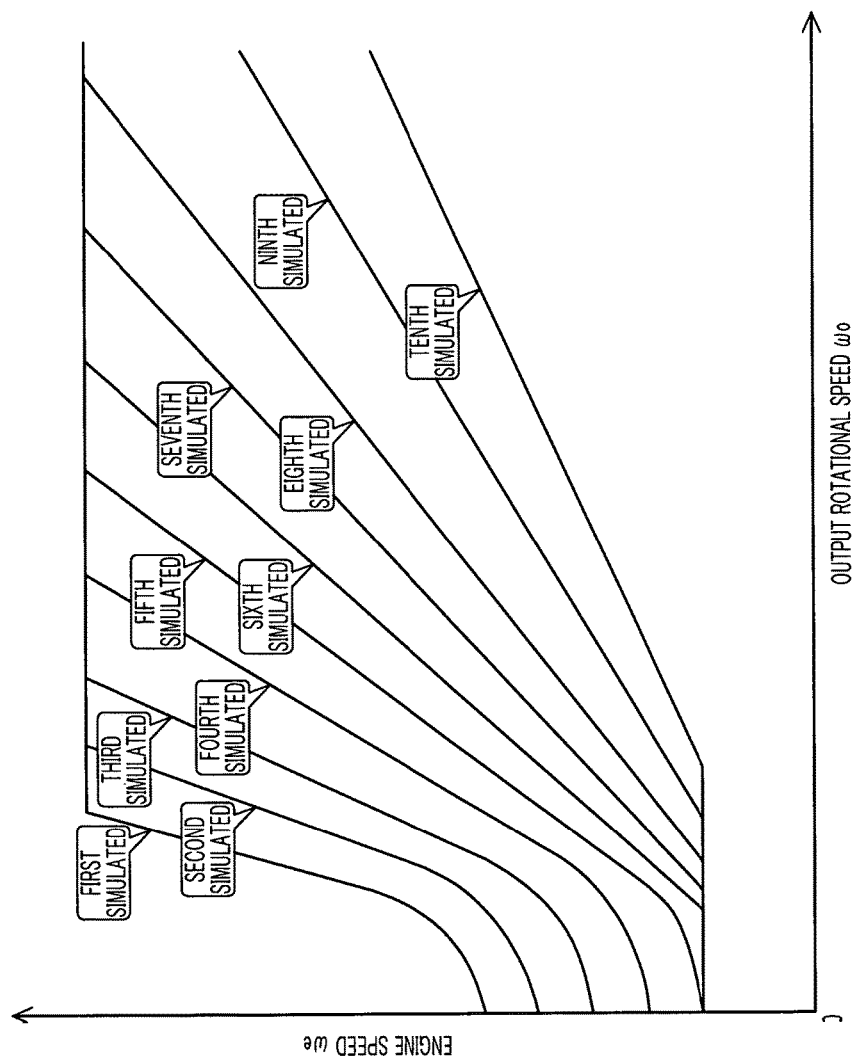
FIG. 5 is a chart that illustrates one example of a plurality of simulated gear stages, each of which is established when a gear ratio of the electric continuously variable transmission mechanism in FIG. 1 is changed stepwise.

For example, as shown in FIG. 5, the plurality of simulated gear stages can be established when the engine speed $\omega e$ is controlled by the first rotary machine MG1 in accordance with the output rotational speed $\omega o$, so as to be able to maintain the gear ratio $\gamma t$ at each of the plurality of simulated gear stages. The gear ratio $\gamma t$ at each of the simulated gear stages does not always need to have a constant value (a straight line that passes a point of origin 0 in FIG. 5). The gear ratio $\gamma t$ may be changed within a specified range or may be restricted by setting an upper limit, a lower limit, or the like of the rotational speed of each of the components. FIG. 5 shows a case where a first simulated gear stage to a tenth simulated gear stage are provided as the plurality of simulated gear stages and the gear stage can be changed at ten stages. As it is apparent from this FIG. 5, in order to establish any of the plurality of simulated gear stages, only the engine speed $\omega e$ has to be controlled in accordance with the output rotational speed $\omega o$. The specified simulated gear stage can be established irrespective of a type of the AT gear stage of the mechanical stepped transmission mechanism 20.

Figures 6, 7:
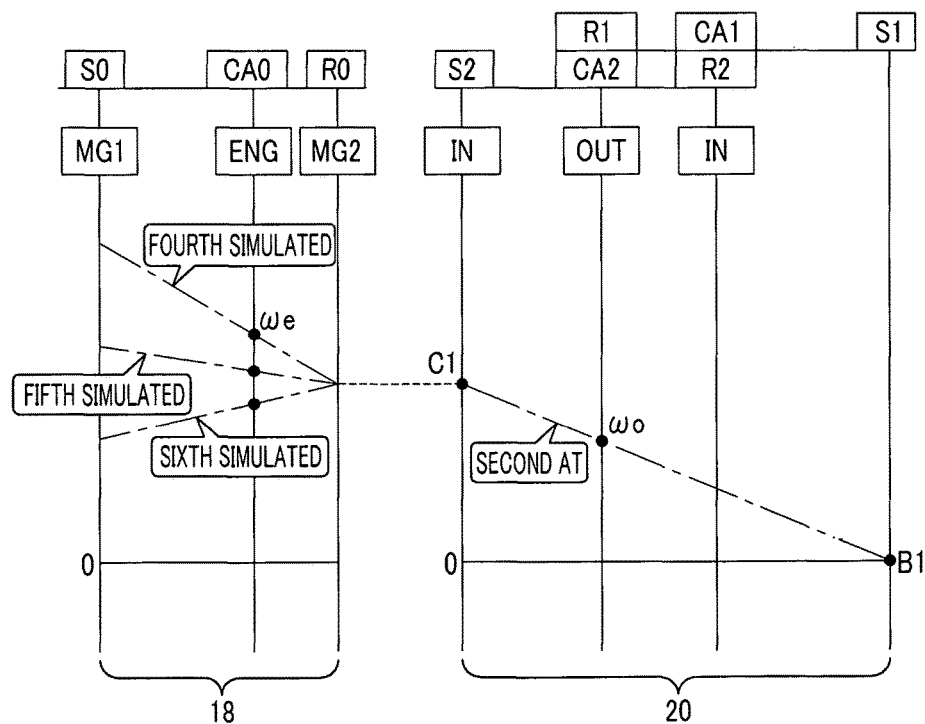
FIG. 6 is one example of a gear stage allocation table in which the plurality of simulated gear stages are allocated to each of the plurality of AT gear stages.
FIG. 7 is a collinear diagram in which a simulated fourth gear stage to a simulated sixth gear stage, each of which is established at a second AT gear stage, are exemplified.

For example, by combining each of the AT gear stages of the stepped transmission mechanism 20 and one or more types of the gear ratio $\gamma 0$ of the continuously variable transmission mechanism 18, the simulated gear stages are allocated such that one or more types thereof are established for each of the AT gear stages of the stepped transmission mechanism 20. For example, FIG. 6 is one example of a gear stage allocation (gear ratio assignment) table. The table is defined in advance such that the first simulated gear stage to the third simulated gear stage are established for the first AT gear stage, the fourth simulated gear stage to the sixth simulated gear stage are established for the second AT gear stage, the seventh simulated gear stage to the ninth simulated gear stage are established for the third AT gear stage, and the tenth simulated gear stage is established for the fourth AT gear stage. In the same collinear diagram as in FIG. 3, FIG. 7 exemplifies a case where the fourth simulated gear stage to the sixth simulated gear stage are established when the AT gear stage of the stepped transmission mechanism 20 is the second AT gear stage. Each of the simulated gear stages is established by controlling the continuously variable transmission mechanism 18 such that the engine speed $\omega e$ realizes the specified gear ratio $\gamma t$ with respect to the output rotational speed $\omega o$.

Returning to FIG. 1, the vehicle 10 includes the electronic control unit 80 that functions as a controller for executing control of the engine 14, the continuously variable transmission mechanism 18, the stepped transmission mechanism 20, and the like. FIG. 1 is a view of an input/output system of the electronic control unit 80, and is also a functional block diagram that illustrates a main section of the control function by the electronic control unit 80. The electronic control unit 80 is configured by including a so-called microcomputer that includes a CPU, RAM, ROM, an input/output interface, and the like, for example. The CPU performs signal processing in accordance with a program stored in the ROM in advance while using a temporary storage function of the RAM, and thereby executes various types of the control of the vehicle 10. The electronic control unit 80 is configured to be divided for engine control, the gear change control, and the like when necessary.

The electronic control unit 80 is supplied with various signals and the like (for example, the engine speed ωe, the MG1 rotational speed ωg as the rotational speed of the first rotary machine MG1, the MG2 rotational speed ωm as the AT input rotational speed ωi, the output rotational speed ωo that corresponds to the vehicle speed V, the accelerator operation amount θacc as an accelerating operation amount (that is, an operation amount of an accelerator pedal) by the driver that represents a magnitude of the accelerating operation by the driver, a throttle valve opening degree 8th as an opening degree of an electronic throttle valve, forward/reverse acceleration G of the vehicle 10, an operation position POSsh of a shift lever 56 as a shift operation member provided in the vehicle 10, a battery temperature THbat, a battery charged/discharged current Ibat, and a battery voltage Vbat of the battery 52, and the like) that are based on detection values of various sensors and the like (for example, an engine speed sensor 60, an MG1 rotational speed sensor 62, an MG2 rotational speed sensor 64, an output rotational speed sensor 66, an accelerator operation amount sensor 68, a throttle valve opening degree sensor 70, a G sensor 72, a shift position sensor 74, a battery sensor 76, and the like) provided in the vehicle 10. The electronic control unit 80 outputs various command signals (for example, an engine control command signal Se for the control of the engine 14, a rotary machine control command signal Smg for the control of the first rotary machine MG1 and the second rotary machine MG2, the hydraulic control command signal Sat for the control of the actuation states of the pump motor 102 and the engagement devices CB (that is, for the gear change control of the stepped transmission mechanism 20), a failure display command signal Sds, and the like) to devices (for example, a throttle actuator, a fuel injector, an engine control unit 58 such as an igniter, the inverter 50, the hydraulic control circuit 54, and a failure display device 48, and the like) provided in the vehicle 10. The hydraulic control command signal Sat is a command signal (a drive current) used to drive the linear solenoid valves SL1 to SL4 each regulate the engagement hydraulic pressure Pcb to be supplied to the corresponding hydraulic actuators 120 to 126 of the engagement devices CB, for example. The electronic control unit 80 sets a hydraulic command value (an instructed pressure) that corresponds to a value of the engagement hydraulic pressure Pcb to be supplied to each of the hydraulic actuators 120 to 126, and outputs the drive current that corresponds to the hydraulic command value. The failure display device 48 is a device that notifies failure of the stepped transmission mechanism 20 by lighting a warning lamp or generating warning sound, and is provided in an instrument panel near a driver's seat or the like.

The operation position POSsh of the shift lever 56 includes P, R, N, and D operation positions, for example. The P operation position is a parking operation position at which a parking position (a P position) of the transmission 40 is selected. At the parking position of the transmission 40, the transmission 40 is brought into the neutral state (for example, the stepped transmission mechanism 20 is brought into the neutral state where the power cannot be transmitted due to the disengagement of all of the engagement devices CB), and the rotation of the output shaft 22 is mechanically inhibited (locked). The R operation position is a reverse travel operation position at which a reverse travel position (an R position) of the transmission 40 is selected. At the reverse travel position of the transmission 40, the reverse travel of the vehicle 10 can be made by the MG2 torque TmR for the reverse travel in a state where the first AT gear stage "1st" of the stepped transmission mechanism 20 is established. The N operation position is a neutral operation position at which a neutral position (an N position) of the transmission 40 is selected. At the neutral position of the transmission 40, the transmission 40 is brought into the neutral state. The D operation position is a forward travel operation position at which a forward travel position (a D position) of the transmission 40 is selected. At the forward travel position of the transmission 40, automatic gear change control is executed by using all of the AT gear stages of the stepped transmission mechanism 20 from the first AT gear stage "1st" to the fourth AT gear stage "4th" (for example, by using all of the simulated gear stages from the first simulated gear stage to the tenth simulated gear stage), and the vehicle 10 can thereby travel forward. The shift lever 56 functions as a switching operation member that receives a switching request of the shift position of the transmission 40 when being operated by a person.

The electronic control unit 80 computes a state of charge (remaining charge amount) SOC of the battery 52 on the basis of the battery charged/discharged current. That, the battery voltage Vbat, and the like, for example. In addition, the electronic control unit 80 computes chargeable electricity (input-enabled electricity) Win that defines a restriction on input electricity of the battery 52 and a dischargeable electricity (output-enabled electricity) Wout that defines a restriction on output electricity of the battery 52 on the basis of the battery temperature THbat and the state of charge SOC of the battery 52, for example. The chargeable and dischargeable electricity Win, Wout is set to be lower as the battery temperature THbat is decreased in a low-temperature range where the battery temperature THbat is lower than that in a normal use range, and is set to be lower as the battery temperature THbat is increased in a high-temperature range where the battery temperature THbat is higher than that in the normal use range, for example. In addition, the chargeable electricity Win is decreased as the state of charge SOC is increased in a region where the state of charge SOC is high, for example. The dischargeable electricity Wout is decreased as the state of charge SOC is decreased in a region where the state of charge SOC is low, for example.

The electronic control unit 80 executes the various types of the control in the vehicle 10. An AT gear change control section 82, a hybrid control section 84, and a failure-time control section 90 shown in FIG. 1 represent main sections of various control functions that are executed by the electronic control unit 80 when the main sections of the various control functions are illustrated as control sections.

The AT gear change control section 82 makes a gear change determination of the stepped transmission mechanism 20 by using a relationship (for example, an AT gear stage change map) that is calculated and stored experimentally or in design wise in advance (that is, predetermined), executes the gear change control of the stepped transmission mechanism 20 when necessary, and outputs the hydraulic control command signal Sat, which is used to switch the engaged/disengaged states of the engagement devices CB by the solenoid valves SL1 to SL4, to the hydraulic control circuit 54, so as to automatically switch the AT gear stage of the stepped transmission mechanism 20. The above AT gear stage change map corresponds to a gear change condition and is defined by gear change lines denoted by "AT" in FIG. 8, for example. Solid lines are upshift lines, and broken lines are downshift lines. A specified hysteresis is provided between two each of the upshift lines or the downshift lines. This gear change map is defined on two-dimensional coordinates having the output rotational speed ωo (the vehicle speed V has the same meaning herein) and the accelerator operation amount θacc (requested drive torque Tdem, the throttle valve opening degree 0th, and the like have the same meaning herein) as variables, for example, and is defined such that the AT gear stage is switched to that on the high vehicle speed side (the high side) at which the gear ratio γat is low as the output rotational speed ωo is increased and that the AT gear stage is switched to that on the low vehicle speed side (the low side) at which the gear ratio γat is high as the accelerator operation amount θacc is increased.

The hybrid control section 84 has a function as engine control means, that is, an engine control section that controls actuation of the engine 14 and a function as rotary machine control means, that is, a rotary machine control section that controls actuation of the first rotary machine MG1 and the second rotary machine MG2 via the inverter 50, and executes hybrid drive control by the engine 14, the first rotary machine MG1, and the second rotary machine MG2, and the like by those control functions. For example, the hybrid control section 84 computes a requested driving force Pdem (from a different perspective, the requested drive torque Tdem at the vehicle speed V at the time) on the basis of the accelerator operation amount θacc, the vehicle speed V, and the like. Then, in consideration of the chargeable and dischargeable electricity Win, Wout of the battery 52 and the like, the hybrid control section 84 outputs the command signals (the engine control command signal Se and the rotary machine control command signal Smg) that are used to control the engine 14, the first rotary machine MG1, and the second rotary machine MG2, so as to realize the requested driving force Pdem. The engine control command signal Se is a command value of engine power Pe with which the engine torque Te at the engine speed ωe at the time is output, for example. The rotary machine control command signal Smg is a command value of the generated electricity Wg of the first rotary machine MG1 that outputs the reaction torque (the MG1 torque Tg at the MG1 rotational speed ωg at the time) of the engine torque Te, and is also a command value of consumed electricity Wm of the second rotary machine MG2 that outputs the MG2 torque Tm at the MG2 rotational speed ωm at the time, for example.

The hybrid control section 84 selectively establishes the motor travel mode or the hybrid travel mode as the travel mode in accordance with a vehicle state. For example, when the requested driving force Pdem is in a motor travel region (for example, a region at the low vehicle speed and the low drive torque) that is lower than a predetermined threshold, the hybrid control section 84 establishes the motor travel mode in which the engine 14 is stopped and the vehicle 10 travels only by the second rotary machine MG2. Meanwhile, when the requested driving force Pdem is in a hybrid travel region that is equal to or higher than the predetermined threshold, the hybrid control section 84 establishes the hybrid travel mode in which the vehicle 10 travels by actuating the engine 14. In the hybrid travel mode, torque assist is executed when necessary. In the torque assist, electrical energy from the first rotary machine MG1, which is subjected to regenerative control, and/or electrical energy from the battery 52 is supplied to the second rotary machine MG2, the second rotary machine MG2 is driven (power running control) to apply the torque to the drive wheels 28, and the power of the engine 14 is thereby assisted. In addition, even in the motor travel region, in the case where the state of charge SOC or the dischargeable electricity Wout of the battery 52 is lower than a predetermined threshold, the hybrid travel mode is established. When the travel mode is shifted from the motor travel mode to the hybrid travel mode, regardless of whether the vehicle 10 travels or is stopped, the engine 14 can be cranked by increasing the engine speed ωe by the first rotary machine MG1, for example.

The hybrid control section 84 also includes a stepless gear change control section 86 that functions as stepless gear change control means and a simulated stepped gear change control section 88 that functions as simulated stepped gear change control means. The stepless gear change control section 86 actuates the continuously variable transmission mechanism 18 as the continuously variable transmission and thereby actuates the transmission 40 as the whole as the continuously variable transmission. For example, in consideration of an engine optimum fuel economy line and the like, the stepless gear change control section 86 controls the engine 14 to obtain the engine speed ωe and the engine torque Te with which the engine power Pe realizing the requested driving force Pdem is obtained, and also controls the generated electricity Wg of the first rotary machine MG1. In this way, the stepless gear change control section 86 executes stepless gear change control of the continuously variable transmission mechanism 18, so as to change the gear ratio γ0 of the continuously variable transmission mechanism 18. As a result of this control, the gear ratio γt of the transmission 40 as the whole at the time when the transmission 40 is actuated as the continuously variable transmission is controlled. During the failure of the stepped transmission mechanism 20 or the like, the stepless gear change control section 86 controls the actuation state (the engine speed ωe and the engine torque Te) of the engine 14 in a manner to separate the actuation state from the above engine optimum fuel economy line such that the engine 14 can output the maximum power when necessary in such a case where the accelerator operation amount θacc is large. In addition, the stepless gear change control section 86 changes the gear ratio γ0 of the continuously variable transmission mechanism 18 in the stepless manner by controlling the generated electricity Wg of the first rotary machine MG1.

Figure 8:
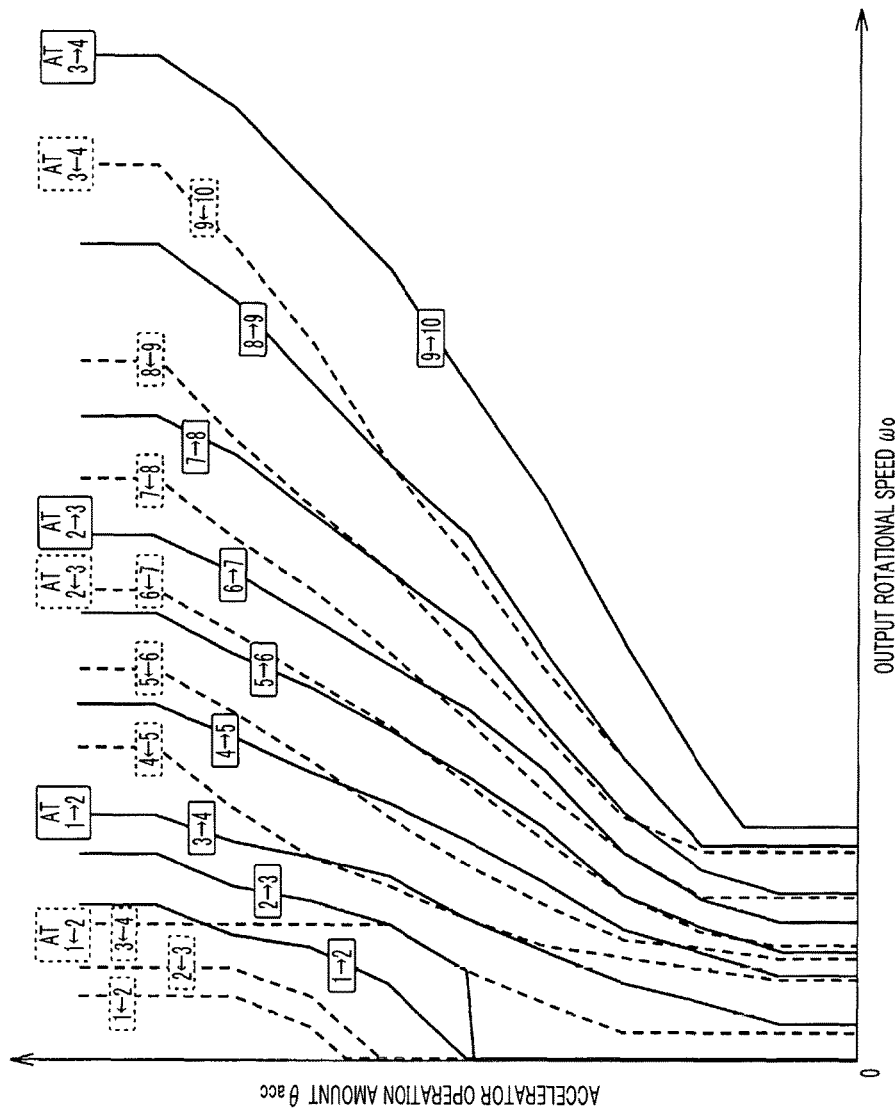
FIG. 8 is one example of a simulated gear stage change map that is used for gear change control of the plurality of simulated gear stages.

The simulated stepped gear change control section 88 changes the gear ratio of the continuously variable transmission mechanism 18 like the stepped transmission, and thereby changes the gear ratio of the transmission 40 as the whole like the stepped transmission. The simulated stepped gear change control section 88 makes a gear change determination of the transmission 40 by using a predetermined relationship (for example, a simulated gear stage change map), and executes the gear change control (a stepped gear change) of the continuously variable transmission mechanism 18 in cooperation with the gear change control of the AT gear stage of the stepped transmission mechanism 20 by the AT gear change control section 82, so as to selectively establish any of the plurality of simulated gear stages. Similar to the AT gear stage change map, the simulated gear stage change map is predetermined with the output rotational speed ωo and the accelerator operation amount θacc as parameters. FIG. 8 is one example of the simulated gear stage change map. The solid lines are the upshift lines, and the broken lines are downshift lines. By switching the simulated gear stage in accordance with the simulated gear stage change map, similar gear change, feeling to that obtained by the stepped transmission is obtained by the transmission 40 as the whole in which the continuously variable transmission mechanism 18 and the stepped transmission mechanism 20 are arranged in series. Simulated stepped gear change control for changing the gear ratio of the transmission 40 as the whole like the stepped transmission may simply be executed in preference to the stepless gear change control for actuating the transmission 40 as the whole as the continuously variable transmission, for example, in the case where the travel mode with an emphasis on travel performance, such as a sport travel mode, is selected by the driver or in the case where the requested drive torque Tdem is relatively high. However, the simulated stepped gear change control may basically be executed except for a specified execution restricted time. Note that a manual gear change mode in which the simulated gear stage is switched in accordance with a gear change instruction by the driver using the shift lever 56, the up/down switch, or the like may be provided.

The simulated stepped gear change control by the simulated stepped gear change control section 88 and the gear change control of the stepped transmission mechanism 20 by the AT gear change control section 82 are cooperatively executed. In this embodiment, the ten types of the simulated gear stages from the first simulated gear stage to the tenth simulated gear stage are allocated for the four types of the AT gear stages from the first AT gear stage to the fourth AT gear stage. Accordingly, when the gear stage is changed between the third simulated gear stage and the fourth simulated gear stage (described as a simulated 3↔4 gear change), the gear stage is changed between the first AT gear stage and the second AT gear stage (described as an AT 1↔2 gear change). When a simulated 6↔7 gear change is performed, an AT 2↔3 gear change is performed. When a simulated 9↔10 gear change is performed, an AT 3↔4 gear change is performed (see FIG. 6). Thus, the AT gear stage change map is defined such that the AT gear stage is changed at the same timing as gear change timing of the simulated gear stage. More specifically, the upshift lines "3→4", "6→7", "9→10" of the simulated gear stages in FIG. 8 respectively match the upshift lines "1→2", "2→3", "3→4" in the AT gear stage change map (see "AT 1→2" in FIG. 8 and the like). In addition, the downshift lines "3←4", "6←7", "9←10" of the simulated gear stages in FIG. 8 respectively match the downshift lines "1←2", "2←3", "3←4" in the AT gear stage change map (see "AT 1←2" in FIG. 8 and the like). Alternatively, a gear change command of the AT gear stage may be output to the AT gear change control section 82 on the basis of the gear change determination of the simulated gear stage by using the simulated gear stage change map in FIG. 8. Just as described, the AT gear change control section 82 switches the AT gear stage of the stepped transmission mechanism 20 when the simulated gear stage is switched. Because the AT gear stage is changed at the same timing as the gear change timing of the simulated gear stage, the gear stage of the stepped transmission mechanism 20 is changed in conjunction with a change in the engine speed ωe. In this way, the driver is less likely to receive the sense of discomfort even when the shock occurs in association with the gear change of the stepped transmission mechanism 20.

The failure-time control section 90 executes failure-time control (fail-safe control) that allows the travel in the limp home mode when engagement failure of the engagement device CB occurs due to failure of any of the linear solenoid valves SL1 to SL4 and the like that is involved in the gear change control of the stepped transmission mechanism 20. The failure-time control section 90 includes: a failure detection section 92 that functions as failure detection means; and a failure-time all-OFF control section 94 that functions as failure-time all-OFF control means, and performs signal processing in accordance with steps S1 to S5 (hereinafter simply referred to as S1 to S5) of a flowchart in FIG. 9. S1 in FIG. 9 corresponds to the failure detection section 92, and S3 corresponds to the failure-time all-OFF control section 94.

Figure 9:
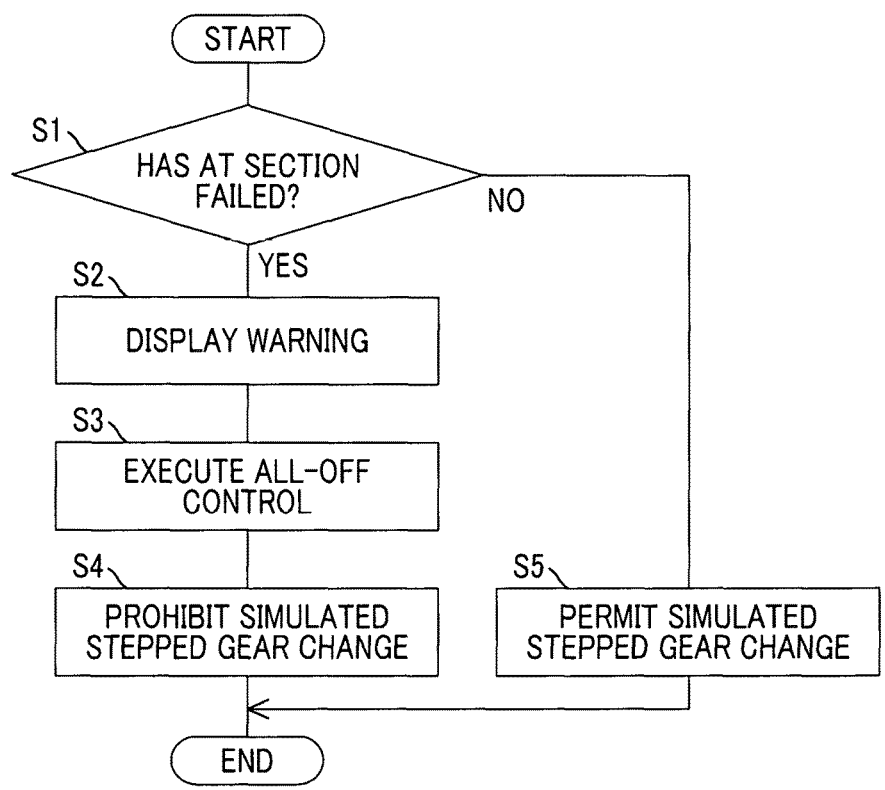
FIG. 9 is a flowchart that specifically illustrates actuation by an electronic control unit.

In S1 of FIG. 9, it is determined whether the stepped transmission mechanism 20 (an AT section) has failed. The failure of the stepped transmission mechanism 20 is such failure that the gear change control of the stepped transmission mechanism 20 cannot appropriately be executed, and an example of the failure is the disconnection of or detachment of connectors for the linear solenoid valves SL1 to SL4, which execute the engagement/disengagement control of the engagement devices CB, the output rotational speed sensor 66, or the like. In this embodiment, it is determined whether racing that causes an excessive increase in the AT input rotational speed ωi, that is, the MG2 rotational speed ωm has occurred at the start of the vehicle or during the travel of the vehicle. The occurrence of this racing indicates the abnormal power transmission state where the power is not properly transmitted via the engagement devices CB, and examples of the abnormal power transmission state are the engagement failure of the engagement device CB and a case where the detection value of the output rotational speed ωo becomes 0 due to the failure of the output rotational speed sensor 66. When the specified AT gear stage is normally established, a value (ωo×γatR) obtained by multiplying the output rotational speed ωo by a theoretical gear ratio γatR at the current AT gear stage substantially matches the actual AT input rotational speed ωi. Thus, presence or absence of racing can be determined by determining whether the following equation (1) is satisfied, for example. More specifically, in the case where the AT input rotational speed ωi is equal to or higher than a value (ωo×γatR+X) that is obtained by adding a margin value X to the value obtained by multiplying the output rotational speed ωo by the theoretical gear ratio γatR, it is considered that the engagement failure of the engagement device CB causes racing. Thus, such a failure determination that the stepped transmission mechanism 20 has possibly failed is made.

$$\omega i \geq \omega o \times \gamma atR + X \quad (1)$$

If the determination in S1 is NO (negative), that is, if the occurrence of racing cannot be detected, the execution of the simulated stepped gear change control by the simulated stepped gear change control section 88 is permitted in S5, and a series of the control is terminated. If the determination in S1 is YES (positive), that is, if racing is detected and the failure determination is made, the fail-safe control in S2 to S4 is executed. In S2, the failure display command signal Sds is output to the failure display device 48, and the warning lamp is lighted, or the warning sound is generated. In this way, the driver is notified of the occurrence of the failure. Accordingly, even in the case where the gear change control that corresponds to the accelerator operation amount θacc is not executed or desired driving force performance cannot be obtained due to the failure of the stepped transmission mechanism 20, for example, the driver can recognize the failure and promptly make the vehicle 10 travel in the limp home mode depending on the vehicle state or the like when necessary.

In S3, all-OFF control is executed such that the vehicle 10 can travel in the limp home mode regardless of the presence or the absence of the failure of the linear solenoid valves SL1 to SL4. The all-OFF control is control in which all of the power supplies involved in the hydraulic control are turned OFF, in which the switching valve 136 of the all-OFF time gear stage establishing circuit 130 is switched to the connecting position, so as to allow the line pressure PL to be supplied from the bypass oil passages 132, 134 to the clutch C1 and the brake B2, and in which the first AT gear stage "1st" is thereby mechanically established. In this way, even in the case where all or some of the linear solenoid valves SL1 to SL4 fail, the power is transmitted via the stepped transmission mechanism 20 in which the first AT gear stage "1st" is established. Thus, the vehicle 10 can travel in the limp home mode. Note that, in the case where only one of the linear solenoid valves SL1 to SL4 fails, such all-OFF control does not always have to be executed. Any of the AT gear stages, at which the failed linear solenoid valve is not required, may be established as the limp-home mode mechanical gear stage.

In S4, the execution of the simulated stepped gear change control by the simulated stepped gear change control section 88 is prohibited, and the gear ratio of the continuously variable transmission mechanism 18 is changed in the stepless manner by the stepless gear change control section 86. The stepless gear change control section 86 controls the actuation state (the engine speed ωe and the engine torque Te) of the engine 14 and the generated electricity Wg of the first rotary machine MG1 in accordance with the vehicle state such as the vehicle speed V and the accelerator operation amount θacc, and changes the gear ratio γ0 of the continuously variable transmission mechanism 18 in the stepless manner, so as to actuate the engine 14 on the optimum fuel economy line, for example. In addition, in the case where the stepped transmission mechanism 20 is fixed to the first AT gear stage "1st" in the all-OFF control due to the failure of the stepped transmission mechanism 20, the rotational speed a of the intermediate transmission member 30 as the output member of the continuously variable transmission mechanism 18 is restricted in accordance with the vehicle speed V. Thus, the actuation of the engine 14 that is separated from the above optimum fuel economy line is permitted. For example, the actuation state of the engine 14 and the generated electricity Wg of the first rotary machine MG1 are controlled such that the engine 14 can output the maximum power when necessary in such a case where the accelerator operation amount θacc is large. In this way, the gear ratio 70 of the continuously variable transmission mechanism 18 can be changed in the stepless manner, and the driving force performance can significantly be improved. That is, when the stepped transmission mechanism 20 is fixed to the first AT gear stage "1st", the simulated gear stage is limited to the third simulated gear stage or lower by the allocation table in FIG. 6. Accordingly, when the simulated stepped gear change control by the simulated stepped gear change control section 88 is maintained as is, the maximum vehicle speed is limited as it is apparent from FIG. 5. However, because the simulated stepped gear change control is switched to the stepless gear change control, the gear ratio γ0 of the continuously variable transmission mechanism 18 can be decreased even at the first AT gear stage of the stepped transmission mechanism 20. In this way, the maximum vehicle speed can significantly be increased.

Here, an initiation permission condition may be provided for initiation of the fail-safe control in S3 and S4. When the first AT gear stage "1st" is established in a high vehicle speed state of the vehicle 10, the rotational speed ωi of the intermediate transmission member 30 becomes excessively high. Accordingly, as the initiation permission condition, for example, such a condition that the vehicle 10 is in a low vehicle speed state or such a condition that an operation performed after the stop of the vehicle 10 (for example, a power supply turn-on operation of the electronic control unit 80 (a Ready-ON operation)) is detected may be provided. Then, when the initiation permission condition is satisfied, the fail-safe control in S3 and S4 may be initiated.

As described above, according to the electronic control unit 80 of the vehicle 10 in this embodiment, the plurality of simulated gear stages, each of which has the different gear ratio γt, are established for the transmission 40 as the whole by the simulated stepped gear change control section 88. In this way, when the simulated gear stage is changed by the manual gear change or the automatic gear change, the engine speed ωe is changed for the increase or the decrease. Thus, the superior driving feeling is obtained. For example, when the simulated gear stage is continuously upshifted along with the increase in the vehicle speed V during the acceleration, the engine speed ωe is changed rhythmically for the increase or the decrease in accordance with the change in the simulated gear stage. Thus, the superior acceleration feeling is obtained.

Meanwhile, in the failure-time control (the fail-safe control) of the case where it is determined that the stepped transmission mechanism 20 has failed, the first AT gear stage "1st" is mechanically established as the limp-home mode mechanical gear stage by the all-OFF control. In this way, the vehicle 10 can travel in the limp home mode. In addition, the simulated stepped gear change control is prohibited, and the gear ratio of the continuously variable transmission mechanism 18 is changed in the stepless manner on the basis of the vehicle state such as the accelerator operation amount θacc and the vehicle speed V. Accordingly, while the rotational speed ωi of the intermediate transmission member 30 is restricted in accordance with the vehicle speed V by fixing the stepped transmission mechanism 20 to the first AT gear stage "1st", a restriction on the engine speed ωe by the vehicle speed V is relaxed. Thus, when the gear ratio of the continuously variable transmission mechanism 18 is changed in the stepless manner, so as to actuate the engine 14 on the optimum fuel economy line, fuel economy can be improved. In addition, when the gear ratio of the continuously variable transmission mechanism 18 is changed in the stepless manner, so as to be able to use the maximum power of the engine 14 when necessary, the power performance that is required for the travel in the limp home mode can be secured.

When the failure determination of the stepped transmission mechanism 20 is made, the first AT gear stage "1st", which is the lowest-speed mechanical gear stage, is mechanically established as the limp-home mode mechanical gear stage. Accordingly, high torque can be output at the high gear ratio γt. Therefore, the maximum power performance can be secured for the travel in the limp home mode.

The vehicle 10 has the stepped transmission mechanism 20, in which the plurality of AT gear stages "1st" to "4th" are established when the engaged/disengaged states of the hydraulic engagement devices CB are switched by the linear solenoid valves SL1 to SL4. The hydraulic control circuit 54 of the stepped transmission mechanism 20 includes the all-OFF time gear stage establishing circuit 130 that establishes the first AT gear stage "1st" as the limp-home mode mechanical gear stage during the all-power-supply OFF time. When the failure determination of the stepped transmission mechanism 20 is made, all of the power supplies are turned OFF, and the first AT gear stage "1st" is established. In this way, without identifying a failed part(s) such as the linear solenoid valves SL1 to SL4, all of the power supplies are turned OFF, the first AT gear stage "1st" is established, and the vehicle 10 can thereby travel in the limp home mode.

When the failure determination of the stepped transmission mechanism 20 is made, such a warning that the stepped transmission mechanism 20 has failed is displayed by the failure display device 48. Accordingly, even in the case where the gear change control that corresponds to the accelerator operation amount θacc is not executed or the desired driving force performance cannot be obtained, for example, during the travel in the limp home mode by the fail-safe control, which is executed by the failure-time control section 90, the driver can recognize the failure by the warning and promptly make the vehicle 10 travel in the limp home mode depending on the vehicle state or the like when necessary.

The embodiment of the disclosure has been described so far in detail on the basis of the drawings. The disclosure can also be applied to other aspects.

For example, in the above-described embodiment, the stepped transmission mechanism 20 is the automatic transmission of the planetary gear type in which the four forward AT gear stages are established. However, the disclosure is not limited to this aspect. For example, the stepped transmission mechanism 20 may be an automatic transmission such as a dual clutch transmission (DCT). The DCT is a synchronously-meshing, parallel-shaft automatic transmission, is a type of a transmission that includes two systems of input shafts, in which a hydraulic friction engagement device (a clutch) is provided on the input shaft of each of the systems, and odd-numbered and even-numbered gear stages are respectively established by the hydraulic friction engagement devices. In addition, the mechanical stepped transmission mechanism capable of establishing a reverse gear stage, at which a rotational direction is reversed, can be adopted.

In the above-described embodiment, the differential mechanism 32 is configured as the planetary gear device of the single-pinion type that has the three rotational elements. However, the disclosure is not limited to this aspect. For example, the differential mechanism 32 may be a differential mechanism that has four or more rotational elements by mutually coupling the plurality of planetary gear devices. In addition, the differential mechanism 32 may be the planetary gear device of the double-pinion type. Furthermore, in the differential mechanism 32 of the embodiment, the engine 14 is coupled to the rotational element RE1 (the carrier CA0), which is located in the middle in the collinear diagram of FIG. 3. However, for example, the AT input rotational member (the intermediate transmission member 30) may be coupled to the rotational element that is located in the middle in the collinear diagram. Thus, various aspects can be adopted.

The embodiment of the disclosure has been described so far in detail on the basis of the drawings. However, what has been described is merely one embodiment, and the disclosure can be implemented in aspects by making various modifications and improvements on the basis of knowledge of a person skilled in the art.

What is claimed is:

1. A controller for a vehicle,
the vehicle including a continuously variable transmission mechanism, a mechanical stepped transmission mechanism, and a drive wheel, the continuously variable transmission mechanism being configured to change a rotational speed of a drive source in a stepless manner and transmit the rotational speed to an intermediate transmission member, the mechanical stepped transmission mechanism being disposed between the intermediate transmission member and the drive wheel, and the mechanical stepped transmission mechanism being configured to mechanically establish a plurality of mechanical gear stages, each of which has a different first gear ratio of a rotational speed of the intermediate transmission member with respect to an output rotational speed,
the controller comprising
an electronic control unit configured to execute gear change control of the mechanical stepped transmission mechanism so as to establish any simulated gear stage of a plurality of simulated gear stages and to change a gear ratio of the continuously variable transmission mechanism stepwise, the plurality of simulated gear stages being gear stages, each of which has a different second gear ratio of the rotational speed of the drive source with respect to the output rotational speed of the mechanical stepped transmission mechanism, the plurality of simulated gear stages being allocated such that one or more of the simulated gear stages are established for each of the plurality of mechanical gear stages, and the number of the one or more simulated gear stages is equal to or larger than the number of the plurality of mechanical gear stages, and
when the electronic control unit determines that the mechanical stepped transmission mechanism has failed, the electronic control unit being configured to fix the mechanical stepped transmission mechanism at a limp-home mode mechanical gear stage, prohibit a stepped gear change of the continuously variable transmission mechanism, and change the gear ratio of the continuously variable transmission mechanism in the stepless manner based on a vehicle state, the limp-home mode mechanical gear stage being any mechanical gear stage of the plurality of mechanical gear stages.

2. A controller for the vehicle according to claim 1, wherein
the limp-home mode mechanical gear stage is a lowest-speed mechanical gear stage, the first gear ratio of which is the highest of the plurality of mechanical gear stages.

3. The controller for the vehicle according to claim 1, wherein
the mechanical stepped transmission mechanism is configured to establish the plurality of mechanical gear stages in accordance with engaged state and disengaged state of a plurality of hydraulic engagement devices,
the mechanical stepped transmission mechanism is provided with a hydraulic control circuit that includes solenoid valves,
the solenoid valves are each configured to electrically switch the engaged state and the disengaged state of the hydraulic engagement devices, respectively, the hydraulic control circuit includes a first circuit that mechanically establishes a predetermined limp-home mode mechanical gear stage of the plurality of mechanical gear stages when all power supplies involved in hydraulic control are turned off, and the electronic control unit is configured to establish the limp-home mode mechanical gear stage by turning off all of the power supplies when the electronic control unit determines that the mechanical stepped transmission mechanism has failed.

4. The controller for the vehicle according to claim 1, wherein the vehicle further includes a failure display device, wherein the electronic control unit is configured to make the failure display device display such a warning that the mechanical stepped transmission mechanism has failed when the electronic control unit determines that the mechanical stepped transmission mechanism has failed.

5. The controller for the vehicle according to claim 1, wherein the intermediate transmission member is an output rotational member of the continuously variable transmission mechanism.

6. A control method for a vehicle, the vehicle including a continuously variable transmission mechanism, a mechanical stepped transmission mechanism, a drive wheel, and an electronic control unit, the continuously variable transmission mechanism being configured to change a rotational speed of a drive source in a stepless manner and transmit the rotational speed to an intermediate transmission member, the mechanical stepped transmission mechanism being disposed between the intermediate transmission member and the drive wheel, and the mechanical stepped transmission mechanism being configured to mechanically establish a plurality of mechanical gear stages, each of which has a different first gear ratio of a rotational speed of the intermediate transmission member with respect to an output rotational speed, the control method comprising:

executing gear change control of the mechanical stepped transmission mechanism so as to establish any simulated gear stage of a plurality of simulated gear stages and changing a gear ratio of the continuously variable transmission mechanism stepwise, by the electronic control unit, the plurality of simulated gear stages being gear stages, each of which has a different second gear ratio of the rotational speed of the drive source with respect to the output rotational speed of the mechanical stepped transmission mechanism, the plurality of simulated gear stages being allocated such that one or more of the simulated gear stages are established for each of the plurality of mechanical gear stages, and the number of the one or more simulated gear stages being equal to or larger than the number of the plurality of mechanical gear stages; and when the electronic control unit determines that the mechanical stepped transmission mechanism has failed, fixing the mechanical stepped transmission mechanism at a limp-home mode mechanical gear stage, prohibiting a stepped gear change of the continuously variable transmission mechanism, and changing the gear ratio of the continuously variable transmission mechanism in the stepless manner based on a vehicle state, by the electronic control unit, the limp-home mode mechanical gear stage being any mechanical gear stage of the plurality of mechanical gear stages.

* * * * *